US012555522B2

(12) United States Patent
Zhang

(10) Patent No.: US 12,555,522 B2
(45) Date of Patent: Feb. 17, 2026

(54) INTERLACED ROW DRIVING ARRAY SUBSTRATE, DISPLAY PANEL, AND DISPLAY DEVICE

(71) Applicants: Wuhan Tianma Microelectronics Co., Ltd. Shanghai Branch, Shanghai (CN); Wuhan Tianma Microelectronics Co., Ltd., Wuhan (CN)

(72) Inventor: Mengmeng Zhang, Shanghai (CN)

(73) Assignees: Wuhan Tianma Microelectronics Co., Ltd. Shanghai Branch, Shanghai (CN); Wuham Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 19/050,483

(22) Filed: Feb. 11, 2025

(65) Prior Publication Data

US 2025/0182684 A1 Jun. 5, 2025

(30) Foreign Application Priority Data

Jun. 28, 2024 (CN) ........................ 202410867422.2

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2300/0861* (2013.01); *G09G 2310/0267* (2013.01); *G09G 2310/0286* (2013.01)

(58) Field of Classification Search
CPC .. G09G 3/3266; G09G 3/3611; G09G 3/3674; G09G 3/3677
See application file for complete search history.

(56) References Cited

U.S. PATENT DOCUMENTS 12,424,172 B2 * 9/2025 Xu ...................... G09G 3/3266
2017/0213506 A1 * 7/2017 Shibusawa ........... G09G 3/3266

* cited by examiner

*Primary Examiner* — Ke Xiao
(74) *Attorney, Agent, or Firm* — KDW Firm PLLC

(57) ABSTRACT

An array substrate includes multiple pixel driving circuits and a first gate driving circuit. Each pixel driving circuit includes a first reset transistor and a threshold compensation transistor. A gate of the first reset transistor is electrically connected to a first reset control terminal, and the control terminal of the threshold compensation transistor is electrically connected to a compensation control terminal. The output terminal of an i-th first gate register is electrically connected to both the compensation control terminal of the pixel driving circuit in the g-th row and the first reset control terminal of the pixel driving circuit in the (g+h)-th row, where h is a positive integer greater than 1. In this manner, the reset duration of the first reset transistor in the pixel driving circuit can be extended to ensure that the first reset transistor can be fully reset.

20 Claims, 14 Drawing Sheets

10

INTERLACED ROW DRIVING ARRAY SUBSTRATE, DISPLAY PANEL, AND DISPLAY DEVICE

CROSS-REFERENCE TO RELATED APPLICATION(S)

This application claims priority to Chinese Patent Application No. 202410867422.2 filed Jun. 28, 2024, the disclosure of which is incorporated herein by reference in its entirety.

TECHNICAL FIELD

The present disclosure relates to the field of display technology, in particular, an array substrate, a display panel, and a display device.

BACKGROUND

In the display panels of the existing technology, with the increase of the sizes of the display panels, the delay in scan driving circuits becomes larger, and the superposition frequency is higher, resulting in insufficient reset duration for reset transistors, thus leading to poor display effect of the display panels.

SUMMARY

Embodiments of the present disclosure provide an array substrate, a display panel, and a display device to extend a reset duration of a first reset transistor in a pixel driving circuit, ensuring that the first reset transistor can be fully reset.

In a first aspect, an embodiment of the present disclosure provides an array substrate. The array substrate includes a display region, multiple sub-pixels located in the display region, and a first gate driving circuit.

The sub-pixels include a pixel circuit. The array substrate also includes multiple pixel driving circuits. Each pixel driving circuit includes a drive transistor, a first reset transistor, and a threshold compensation transistor. A first electrode of the first reset transistor is electrically connected to a gate of the drive transistor. A gate of the first reset transistor is electrically connected to a first reset control terminal. A first electrode of the threshold compensation transistor is electrically connected to the gate of the drive transistor. A second electrode of the threshold compensation transistor is electrically connected to a first electrode of the drive transistor. A gate of the threshold compensation transistor is electrically connected to a compensation control terminal.

The array substrate also includes a first gate driving circuit which includes multiple cascaded first gate registers. An output terminal of an i-th first gate register is electrically connected to both a compensation control terminal of a pixel driving circuit in a g-th row and a first reset control terminal of a pixel driving circuit in a (g+h)-th row, where i is a positive integer, g is a positive integer, and h is a positive integer greater than 1.

In a second aspect, an embodiment of the present disclosure also provides a display panel. The display panel includes an array substrate, which includes a display region, multiple sub-pixels located in the display region, and a first gate driving circuit.

The sub-pixels include a pixel circuit. The array substrate also includes multiple pixel driving circuits. Each pixel driving circuit includes a drive transistor, a first reset transistor, and a threshold compensation transistor. A first electrode of the first reset transistor is electrically connected to a gate of the drive transistor. A gate of the first reset transistor is electrically connected to a first reset control terminal. A first electrode of the threshold compensation transistor is electrically connected to the gate of the drive transistor. A second electrode of the threshold compensation transistor is electrically connected to a first electrode of the drive transistor. A gate of the threshold compensation transistor is electrically connected to a compensation control terminal.

The array substrate also includes a first gate driving circuit which includes multiple cascaded first gate registers. An output terminal of an i-th first gate register is electrically connected to both a compensation control terminal of a pixel driving circuit in a g-th row and a first reset control terminal of a pixel driving circuit in a (g+h)-th row, where i is a positive integer, g is a positive integer, and h is a positive integer greater than 1.

In a third aspect, an embodiment of the present disclosure also provides a display device. The display device includes the display panel which includes an array substrate, and the array substrate includes a display region, multiple sub-pixels located in the display region, and a first gate driving circuit.

The sub-pixels include a pixel circuit. The array substrate also includes multiple pixel driving circuits. Each pixel driving circuit includes a drive transistor, a first reset transistor, and a threshold compensation transistor. A first electrode of the first reset transistor is electrically connected to a gate of the drive transistor. A gate of the first reset transistor is electrically connected to a first reset control terminal. A first electrode of the threshold compensation transistor is electrically connected to the gate of the drive transistor. A second electrode of the threshold compensation transistor is electrically connected to a first electrode of the drive transistor. A gate of the threshold compensation transistor is electrically connected to a compensation control terminal.

The array substrate also includes a first gate driving circuit which includes multiple cascaded first gate registers. An output terminal of an i-th first gate register is electrically connected to both a compensation control terminal of a pixel driving circuit in a g-th row and a first reset control terminal of a pixel driving circuit in a (g+h)-th row, where i is a positive integer, g is a positive integer, and h is a positive integer greater than 1.

DETAILED DESCRIPTION

To make the objects, solutions, and advantages of the present disclosure clearer, the solutions of the present disclosure will be completely described below in conjunction with the specific embodiments and the drawings in one or more embodiments of the present disclosure. Apparently, one or more embodiments described herein are part, not all, of one or more embodiments of the present disclosure, and based on one or more embodiments of the present disclosure, all other embodiments obtained by those skilled in the art on the premise that no creative work is done are within the scope of the present disclosure.

During the research, it is found that display panels in the related art typically adopt a progressive row driving method. Illustratively, when a medium-sized display panel requires a low frequency, the reset transistor and the threshold compensation transistor need to be driven separately. Consequently, a first shift register is set to control the threshold compensation transistor of the pixel driving circuit in the first row and the reset transistor of the pixel driving circuit in the second row; the second shift register controls the threshold compensation transistor of the pixel driving circuit in the second row and the reset transistor of the pixel driving circuit in the third row; . . . the N-th shift register controls the threshold compensation transistor of the pixel driving circuit in the N-th row and the reset transistor of the pixel driving circuit in the (N+1)-th row. In this manner, for pixel driving circuits in two adjacent rows, after the reset transistor in the pixel driving circuit in a previous one of the two adjacent rows completes resetting, the reset transistor in the pixel driving circuit in the other of the two adjacent rows proceeds with resetting. For pixel driving circuits in the same row, it is necessary to control the reset transistors in this row of pixel driving circuits to reset prior to that the threshold compensation transistors in this row of pixel driving circuits is controlled to perform data compensation and data signal writing. That is, the timing of the gate control signals output by two adjacent shift registers does not overlap. For example, for the pixel driving circuits in the N-th row, the gate control signal output by the (N−1)-th shift register is used to reset the pixel driving circuit in the N-th row, while the gate control signal output by the N-th shift register is used for data compensation and data signal writing of the pixel driving circuit in the N-th row. The cut-off moment of the gate control signal output by the (N−1)-th shift register is constrained to occur prior to the moment when the N-th shift register outputs the gate control signal, where N is a positive integer greater than 1. As a result, the reset duration for the reset transistor is relatively short, leading to an issue where the black state is not fully achieved, thereby affecting the display quality of the display panel.

Figure 1:
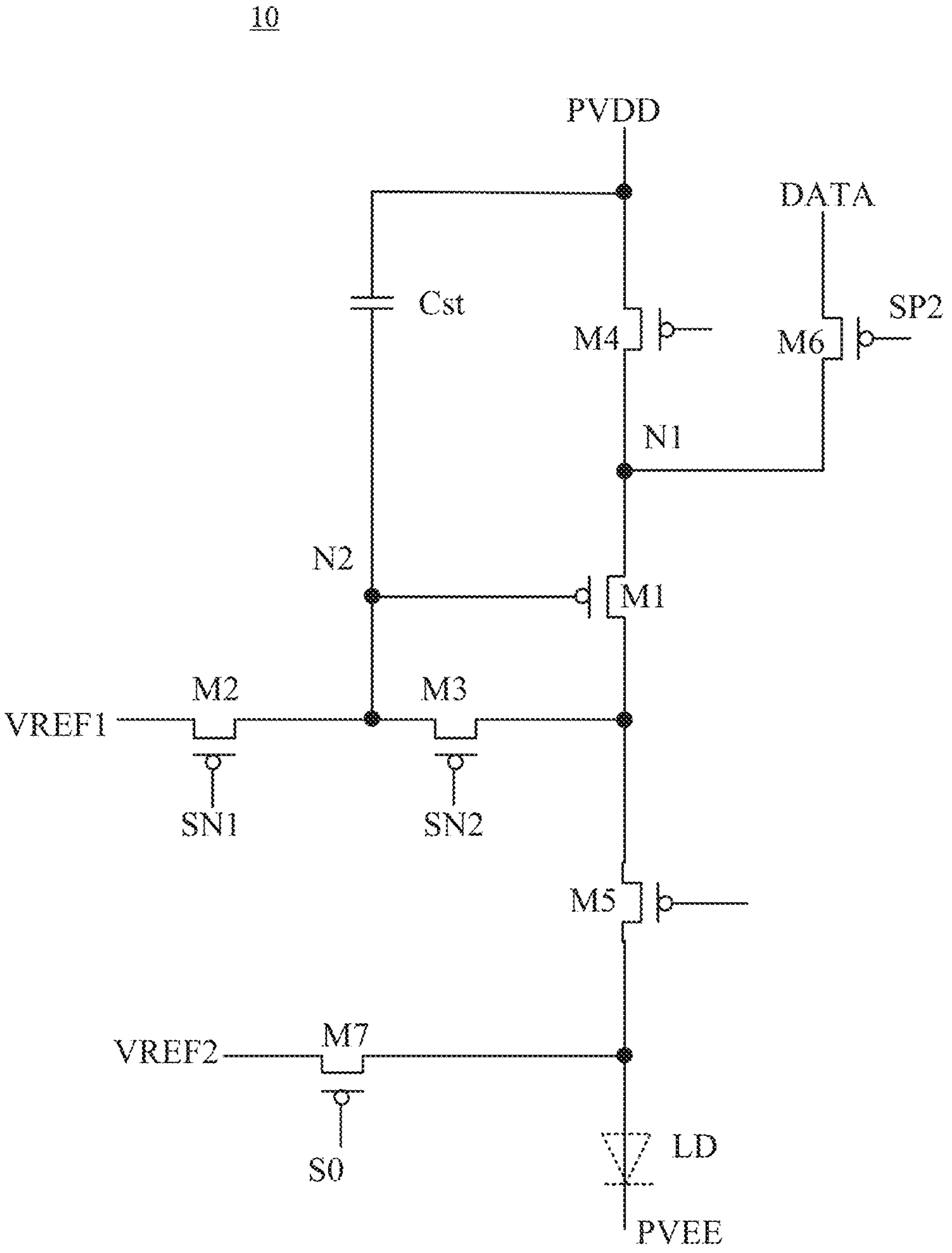
FIG. 1 is a schematic diagram illustrating the structure of a pixel driving circuit according to an embodiment of the present disclosure.
Figure 2:
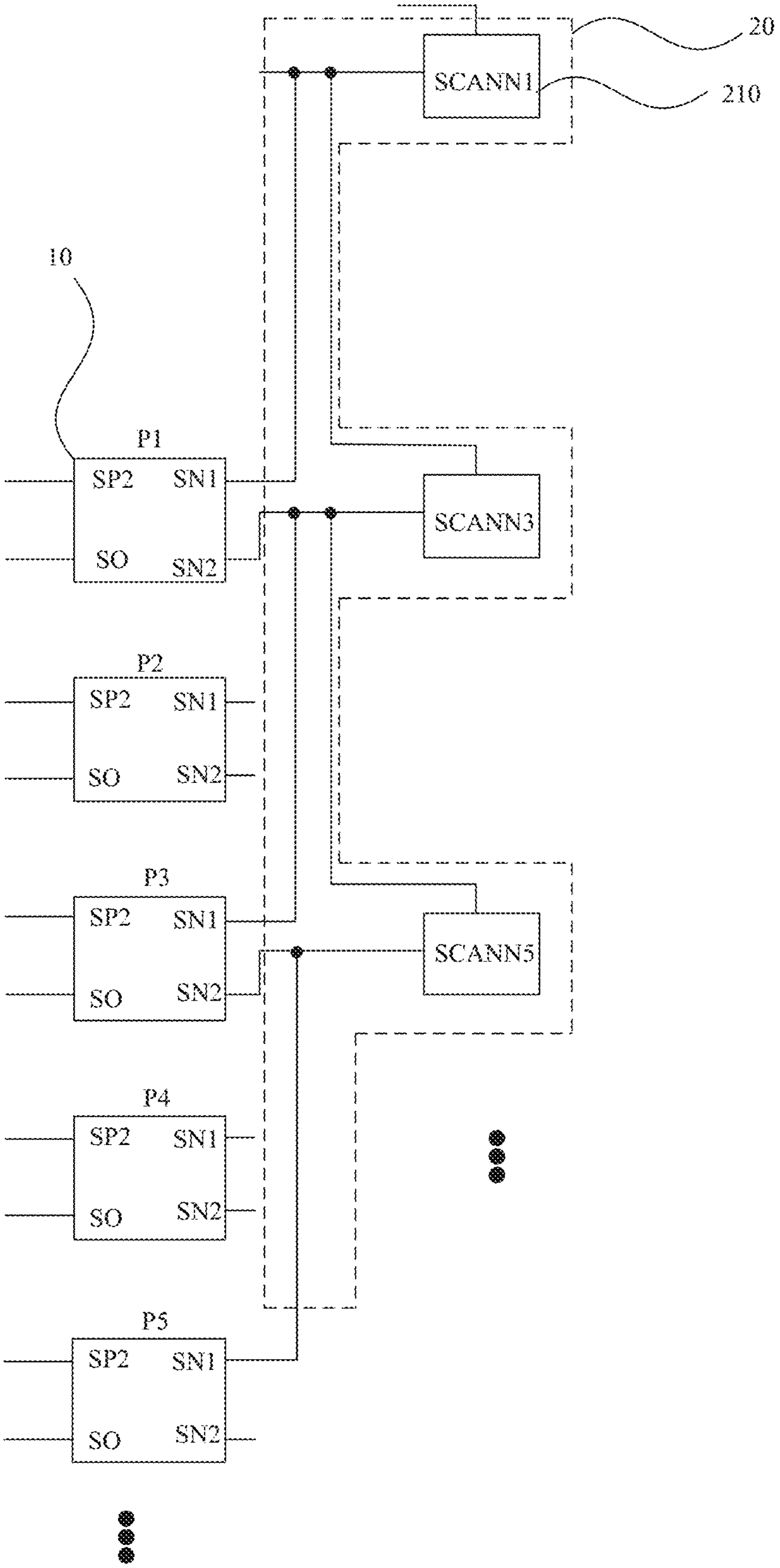
FIG. 2 is a schematic diagram illustrating the connection of pixel driving circuits according to an embodiment of the present disclosure.

FIG. 1 is a schematic diagram illustrating the structure of a pixel driving circuit according to an embodiment of the present disclosure. FIG. 2 is a schematic diagram illustrating the connection of pixel driving circuits according to an embodiment of the present disclosure. With reference to FIG. 1 and FIG. 2, the array substrate includes multiple pixel driving circuits 10. Each pixel driving circuit 10 includes a drive transistor M1, a first reset transistor M2, and a threshold compensation transistor M3. A first electrode of the first reset transistor M2 is electrically connected to a gate of the drive transistor M1. A gate of the first reset transistor M2 is electrically connected to a first reset control terminal SN1. A first electrode of the threshold compensation transistor M3 is electrically connected to the gate of the drive transistor M1. A second electrode of the threshold compensation transistor M3 is electrically connected to a first electrode of the drive transistor M1. A gate of the threshold compensation transistor M3 is electrically connected to a compensation control terminal SN2. The array substrate also includes a first gate driving circuit 20. The first gate driving circuit 20 includes multiple cascaded first gate registers 210. The output terminal of an i-th first gate register 210 is electrically connected to both the compensation control terminal SN2 of the pixel driving circuit 10 in the g-th row and the first reset control terminal SN1 of the pixel driving circuit 10 in the (g+h)-th row. In the context, i is a positive integer, g is a positive integer, and h is a positive integer greater than 1.

In embodiments of the present disclosure, the output terminal of an i-th first gate register is electrically connected to both the compensation control terminal of the pixel driving circuit in the g-th row and the first reset control terminal of the pixel driving circuit in the (g+h)-th row, where h is a positive integer greater than 1. An example where h is 2 is used for illustration. In this case, the output terminal of the second first gate register is electrically connected to both the compensation control terminal of the pixel driving circuit in the first row and the first reset control terminal of the pixel driving circuit in the third row. Similarly, the output terminal of the third first gate register is electrically connected to both the compensation control terminal of the pixel driving circuit in the third row and the first reset control terminal of the pixel driving circuit in the fifth row. In this configuration, the second first gate register controls the first reset control terminal of the pixel driving circuit in the third row to reset, and after an interval of the driving time of one (i.e., h−1=1) row of pixel driving circuits, the third first gate register controls the compensation control terminal of the pixel driving circuit in the third row to perform data compensation and data signal writing. The cut-off moment of the gate control signal output by the second first gate register is constrained to occur prior to that the gate control signal is output by the third first gate register. Since the interval of the driving time of one (i.e, h−1=1) row of pixel driving circuits exists, the reset duration of the first reset transistor in the pixel driving circuit can be extended. Thus, it is ensured that the first reset transistor is fully reset, thereby enhancing the reliability of the pixel driving circuit.

In one or more embodiments shown in FIG. 1, an example where the pixel driving circuit 10 includes seven thin-film transistors and one storage capacitor, that is, a 7T1C circuit is used for illustration. Illustratively, the pixel driving circuit 10 also includes a first light emission control transistor M4 and a second light emission control transistor M5. A first electrode of the first light emission control transistor M4 is electrically connected to a first power signal input terminal PVDD. A second electrode of the first light emission control transistor M4 is electrically connected to a second electrode of the drive transistor M1. The first electrode of the drive transistor M1 is electrically connected to a first electrode of the second light emission control transistor M5. A second electrode of the second light emission control transistor M5 is electrically connected to a second power signal input terminal PVEE. In other words, the drive transistor M1 is connected in series between the first power signal input terminal PVDD and the second power signal input terminal PVEE. During a light-emitting phase, the drive transistor M1 is turned on, and under the influence of the first power signal input from the first power signal input terminal PVDD and the data signal, the drive transistor M1 generates a drive current, which in turn drives a light-emitting element LD to emit light. The first electrode of the first reset transistor M2 is electrically connected to the gate of the drive transistor M1. A second electrode of the first reset transistor M2 is electrically connected to a first reference signal terminal VREF1. The gate of the first reset transistor M2 is electrically connected to the first reset control terminal SN1, thereby resetting the gate potential of the drive transistor M1 under the influence of a first-type gate control signal (that is, a first reset control signal) output by the first reset control terminal SN1. The first electrode of the threshold compensation transistor M3 is electrically connected to the gate of the drive transistor M1. The second electrode of the threshold compensation transistor M3 is electrically connected to the first electrode of the drive transistor M1. The gate of the threshold compensation transistor M3 is electrically connected to the compensation control terminal SN2. The threshold compensation transistor M3 is used to compensate the gate voltage of the drive transistor M1 and write the data signal to the gate of the drive transistor M1 under the control of a second-type gate control signal (that is, a compensation control signal) output by the compensation control terminal SN2.

With reference to FIG. 1 and FIG. 2, multiple cascaded first gate registers 210 sequentially output multiple gate control signals, gate control signals received by the first reset control terminal SN1 include a first-type gate control signal, and gate control signals received by the compensation control terminal SN2 include a second-type gate control signal. The first-type gate control signal and the second-type gate control signal may be signals output by the same first gate register 210 and are distinguished according to different ports of the pixel driving circuit 10 to which the signals are applied. From the perspective of a first gate register 210, the signal output by the first gate register 210 may be referred to as a gate control signal, a first-type gate control signal, or a second-type gate control signal.

In one or more embodiments shown in FIG. 2, an example where h=2 is used for illustration. A pixel driving circuit 10 in the first row is denoted as a first pixel driving circuit P1, a pixel driving circuit 10 in the second row is denoted as a second pixel driving circuit P2, a pixel driving circuit 10 in the third row is denoted as a third pixel driving circuit P3, a pixel driving circuit 10 in the fourth row is denoted as a fourth pixel driving circuit P4, a pixel driving circuit 10 in the fifth row is denoted as a fifth pixel driving circuit P5, and so on. A first first gate register 210 is denoted as a first register SCANN1, a second first gate register 210 is denoted as a third register SCANN3, a third first gate register 210 is denoted as a fifth register SCANN5, and so on. The output terminal of the third register SCANN3 is electrically connected to the compensation control terminal SN2 of the first pixel driving circuit P1 to control the threshold compensation transistor M3 in the first pixel driving circuit P1 for data compensation and writing of data signals. The output terminal of the third register SCANN3 is also electrically connected to the first reset control terminal SN1 of the third pixel driving circuit P3 to control the first reset transistor M2 in the third pixel driving circuit P3 for resetting the gate of the drive transistor M1. Similarly, the output terminal of the fifth register SCANN5 is electrically connected to the compensation control terminal SN2 of the third pixel driving circuit P3 to control the threshold compensation transistor M3 in the third pixel driving circuit P3 for data compensation and writing of data signals. The output terminal of the fifth register SCANN3 is also electrically connected to the first reset control terminal SN1 of the fifth pixel driving circuit P5 to control the first reset transistor M2 in the fifth pixel driving circuit P5 for resetting the gate of the drive transistor M1. Thus, the first reset control terminal SN1 of the third pixel driving circuit P3 is electrically connected to the third register SCANN3, and the first reset control terminal SN1 of the fifth pixel driving circuit P5 is electrically connected to the fifth register SCANN5. The third register SCANN3 outputs a gate control signal to the first reset control terminal SN1 of the pixel driving circuit 10 in the g-th row (third row), and after an interval of the driving time of (h−1) (i.e., 2−1=1) row of pixel driving circuits, the fifth register SCANN5 outputs a gate control signal to the compensation control terminal SN2 of the pixel driving circuit 10 in the g-th row (third row). In this manner, since an interval of the driving time of (h−1) rows of pixel driving circuits exists between the gate control signals output by two adjacent first gate registers 210, that is, interlaced row driving, the reset duration of the first reset transistor M2 in the pixel driving circuit 10 driven in an interlaced row driving manner can be extended, ensuring that the first reset transistor M2 can be fully reset and improving the reliability of the pixel driving circuit 10.

It should be noted that in FIG. 2, h=2 is merely taken as an example for illustration rather than limited thereto. In other embodiments, h may also be other values and may be set by those skilled in the art as needed.

Figure 3:
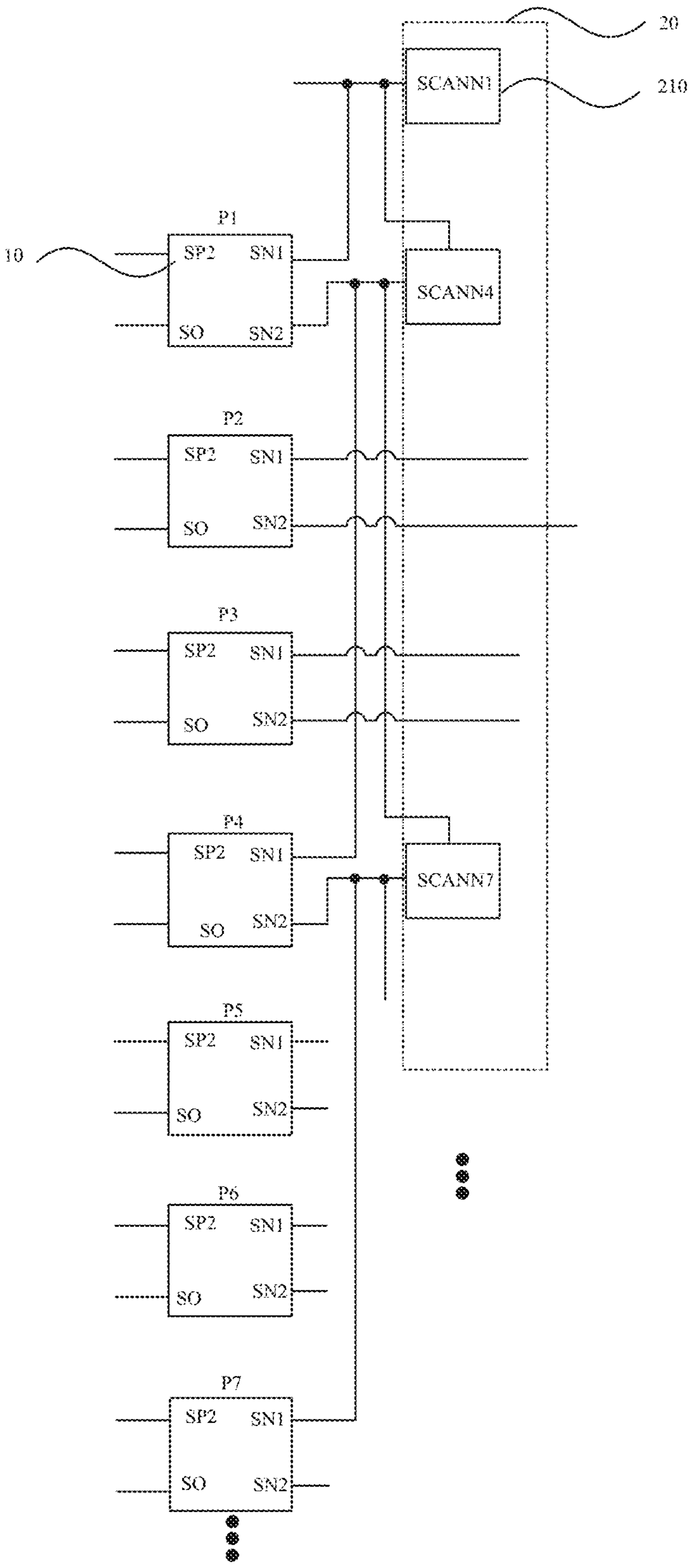
FIG. 3 is another schematic diagram illustrating the connection of pixel driving circuits according to an embodiment of the present disclosure.

FIG. 3 is another schematic diagram illustrating the connection of pixel driving circuits according to an embodiment of the present disclosure. In one or more embodiments as shown in FIG. 3, an example where 3h=3 is used for illustration. A pixel driving circuit 10 in the sixth row is denoted as a sixth pixel driving circuit P6, a pixel driving circuit 10 in the seventh row is denoted as a seventh pixel driving circuit P7, and so on. A first first gate register 210 is denoted as a first register SCANN1, a second first gate register 210 is denoted as a fourth register SCANN4, a third first gate register 210 is denoted as a seventh register SCANN7, and so on. In this case, the output terminal of the fourth register SCANN4 is electrically connected to both the compensation control terminal SN2 of the first pixel driving circuit P1 and the first reset control terminal SN1 of the fourth pixel driving circuit P4. Similarly, the output terminal of the seventh register SCANN7 is electrically connected to both the compensation control terminal SN2 of the fourth pixel driving circuit P4 and the first reset control terminal SN1 of the seventh pixel driving circuit P7. Thus, the first reset control terminal SN1 of the fourth pixel driving circuit P4 is electrically connected to the fourth register SCANN4, and the first reset control terminal SN1 of the seventh pixel driving circuit P7 is electrically connected to the seventh register SCANN7. The fourth register SCANN4 outputs a gate control signal to the first reset control terminal SN1 of the pixel driving circuit 10 in the g-th row (fourth row), and after an interval of the driving time of 2 (3−1=2) rows of pixel driving circuits, the seventh register SCANN7 outputs a gate control signal to the compensation control terminal SN2 of the pixel driving circuit 10 in the g-th row (fourth row). Since an interval of the driving time of (h−1) rows of pixel driving circuits exists between the gate control signals output by two adjacent first gate registers 210, the reset duration of the first reset transistor M2 in the pixel driving circuit 10 driven in an interlaced row driving manner can be increased, ensuring that the first reset transistor M2 can be fully reset and improving the reliability of the pixel driving circuit 10.

Based on the one or more preceding embodiments and with continued reference to FIG. 2, in one or more embodiments, an (i−1)-th first gate register 210 is electrically connected to a first reset control terminal SN1 of the pixel driving circuit 10 in the g-th row; the output terminal of the (i−1)-th first gate register 210 is electrically connected to the input terminal of the i-th first gate register 210, where i is a positive integer greater than 1.

Illustratively, in one or more embodiments shown in FIG. 2, h=2. In this case, the output terminal of the first register SCANN1 is electrically connected to the first reset control terminal SN1 of the first pixel driving circuit P1. The output terminal of the third register SCANN3 is electrically connected to both the compensation control terminal SN2 of the first pixel driving circuit P1 and the first reset control terminal SN1 of the third pixel driving circuit P3. The output terminal of the fifth gate register SCANN5 is electrically connected to both the compensation control terminal SN2 of the third pixel driving circuit P3 and the first reset control terminal SN1 of the fifth pixel driving circuit P5. Two adjacent first gate registers 210 are cascaded, where the output terminal of the first register SCANN1 is also electrically connected to the input terminal of the third register SCANN3, the output terminal of the third register SCANN3 is also electrically connected to the input terminal of the fifth register SCANN5, . . . and the output terminal of the (i−1)-th first gate register 210 is also electrically connected to the input terminal of the i-th first gate register 210. As a result, after the first register SCANN1 outputs a gate control signal, the first reset control terminal SN1 of the first pixel driving circuit P1 receives the gate control signal to control the first reset transistor M2 to turn on for resetting. Subsequently, the third register SCANN3 outputs a gate control signal to the compensation control terminal SN2 of the first pixel driving circuit P1 to control the threshold compensation transistor M3 of the first pixel driving circuit P1 to turn on. The third register SCANN3 also outputs a gate control signal to the first reset control terminal SN1 of the third pixel driving circuit P3 to control the first reset transistor M2 of the third pixel driving circuit P3 to turn on . . . . Thus, by the configuration that two adjacent first gate registers 210 are cascaded, interlaced row driving of the pixel driving circuits 10 can be ensured, which in turn extends the reset duration of the first reset transistors M2 in the pixel driving circuits 10.

Figure 4:
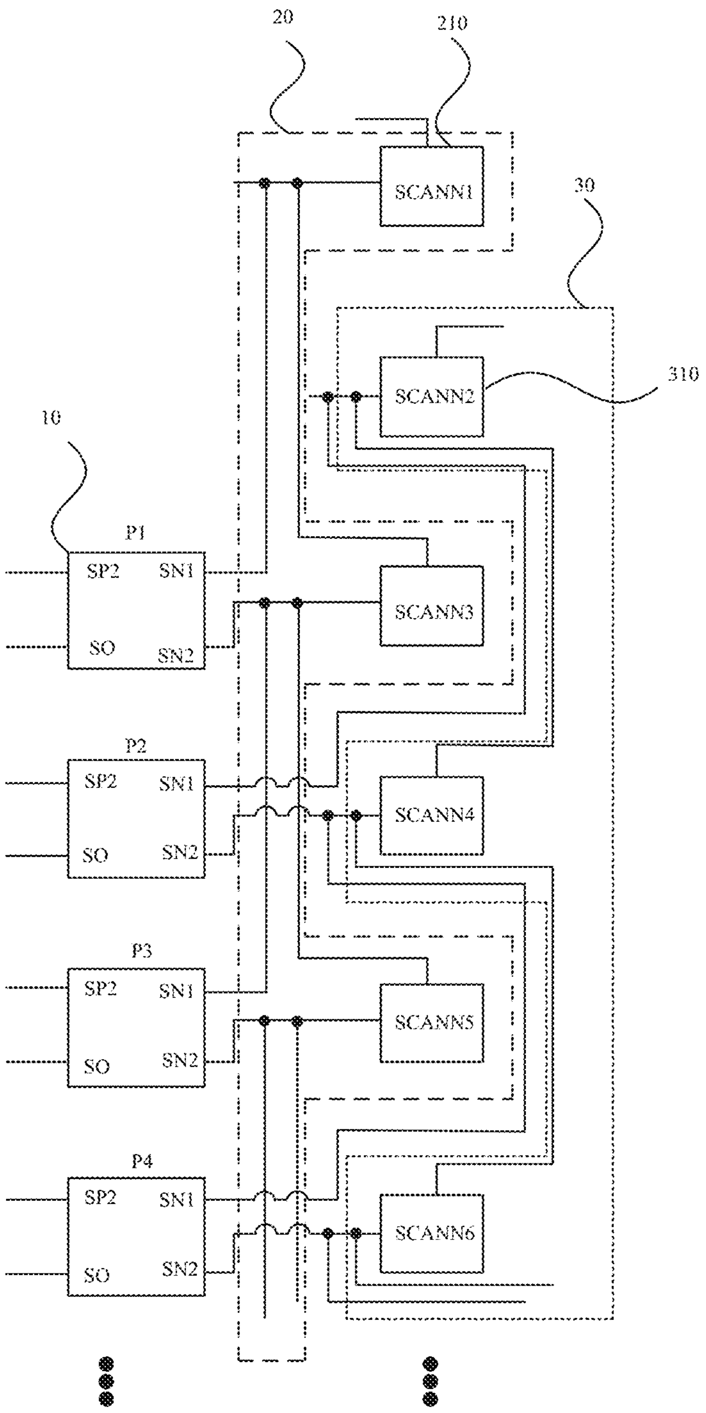
FIG. 4 is yet another schematic diagram illustrating the connection of pixel driving circuits according to an embodiment of the present disclosure.

FIG. 4 is yet another schematic diagram illustrating the connection of pixel driving circuits according to an embodiment of the present disclosure. In one or more embodiments, with reference to FIG. 4, the array substrate also includes a second gate driving circuit 30. The second gate driving circuit 30 includes multiple cascaded second gate registers 310. The output terminal of a j-th second gate register 310 is electrically connected to both a compensation control terminal SN2 of a pixel driving circuit 10 in a α-th row and a first reset control terminal SN1 of a pixel driving circuit 10 in a (p+k)-th row. In this context, p≠g, j is a positive integer, p is a positive integer, and k is a positive integer greater than 1.

Illustratively, in one or more embodiments shown in FIG. 4, the array substrate includes a first gate driving circuit 20 and a second gate driving circuit 30. The first gate driving circuit 20 includes a first register SCANN1, a third register SCANN3, and a fifth register SCANN5. A first one of second gate registers 310 is denoted as a second register SCANN2, a second one of second gate registers 310 is denoted as a fourth register SCANN4, a third one of second gate registers 310 is denoted as a sixth register SCANN6, and so on. The output terminal of the fourth register SCANN4 is electrically connected to the compensation control terminal SN2 of the second pixel driving circuit P2 to control the threshold compensation transistor M3 in the second pixel driving circuit P2 for data compensation and writing of data signals. The output terminal of the fourth register SCANN4 is also electrically connected to the first reset control terminal SN1 of the fourth pixel driving circuit P4 to control the first reset transistor M2 in the fourth pixel driving circuit P4 for resetting the gate of the drive transistor M1.

An example where k=2 is used for illustration. The fourth register SCANN4 outputs a gate control signal to the first reset control terminal SN1 of the pixel driving circuit 10 in the p-th row (fourth row), and after an interval of the driving time of (k−1) (i.e., 2−1=1) rows of pixel driving circuits, the sixth register SCANN6 outputs a gate control signal to the compensation control terminal SN2 of the pixel driving circuit 10 in the p-th row (fourth row). In this manner, since an interval of the driving time of (k−1) rows of pixel driving circuits exists between the gate control signals output by two adjacent second gate registers 310, that is, interlaced row driving, the reset duration of the first reset transistor M2 in the pixel driving circuit 10 driven in an interlaced row driving manner can be extended.

The driving methods for both the first gate driving circuit 20 and the second gate driving circuit 30 are interlaced row driving. Since p≠g, the first gate driving circuit 20 and the second gate driving circuit 30 drive pixel driving circuits 10 in different rows. Furthermore, in one or more embodiments shown in FIG. 4, h=2, and k=2. In this case, the first gate driving circuit 20 drives odd-numbered rows of pixel driving circuits 10, while the second gate driving circuit 30 drives even-numbered rows of pixel driving circuits 10. That is, pixel driving circuits 10 in the first, third, fifth, . . . and i-th rows are connected to the first gate driving circuit 20, and the pixel driving circuits 10 in the second, fourth, sixth, . . . and j-th rows are connected to the second gate driving circuit 30.

Illustratively, the third register SCANN3 drives the compensation control terminal SN2 of the first pixel driving circuit P1 and the first reset control terminal SN1 of the third pixel driving circuit P3. The fourth register SCANN4 drives the compensation control terminal SN2 of the second pixel driving circuit P2 and the first reset control terminal SN1 of the fourth pixel driving circuit P4. The fifth register SCANN5 drives the compensation control terminal SN2 of the third pixel driving circuit P3 and the first reset control terminal SN1 of the fifth pixel driving circuit P5. The sixth register SCANN6 drives the compensation control terminal SN2 of the fourth pixel driving circuit P4 and the first reset control terminal SN1 of the sixth pixel driving circuit P6. With this configuration, the first gate driving circuit 20 and the second gate driving circuit 30 both drive different rows of pixel driving circuits 10 using an interlaced row driving method. An interval of the driving time of (h−1) rows of pixel driving circuits exists between the gate control signals output by two adjacent first gate registers 210, and an interval of the driving time of (k−1) rows of pixel driving circuits exists between the gate control signals output by two adjacent second gate registers 310, where k and h may be the same or different. This configuration helps to extend the reset duration of the first reset transistors M2 in each row of pixel driving circuits 10, ensuring that the first reset transistors M2 can be fully reset, thereby improving the reliability of the pixel driving circuits 10.

It should be noted that in FIG. 4, the array substrate includes a first gate driving circuit 20 and a second gate driving circuit 30, that is, the array substrate includes two groups of gate driving circuits, which is merely taken as an example for illustration rather than limited thereto. In other embodiments, the array substrate may include other numbers of gate driving circuits, which may be configured by those skilled in the art as needed.

Figure 5:
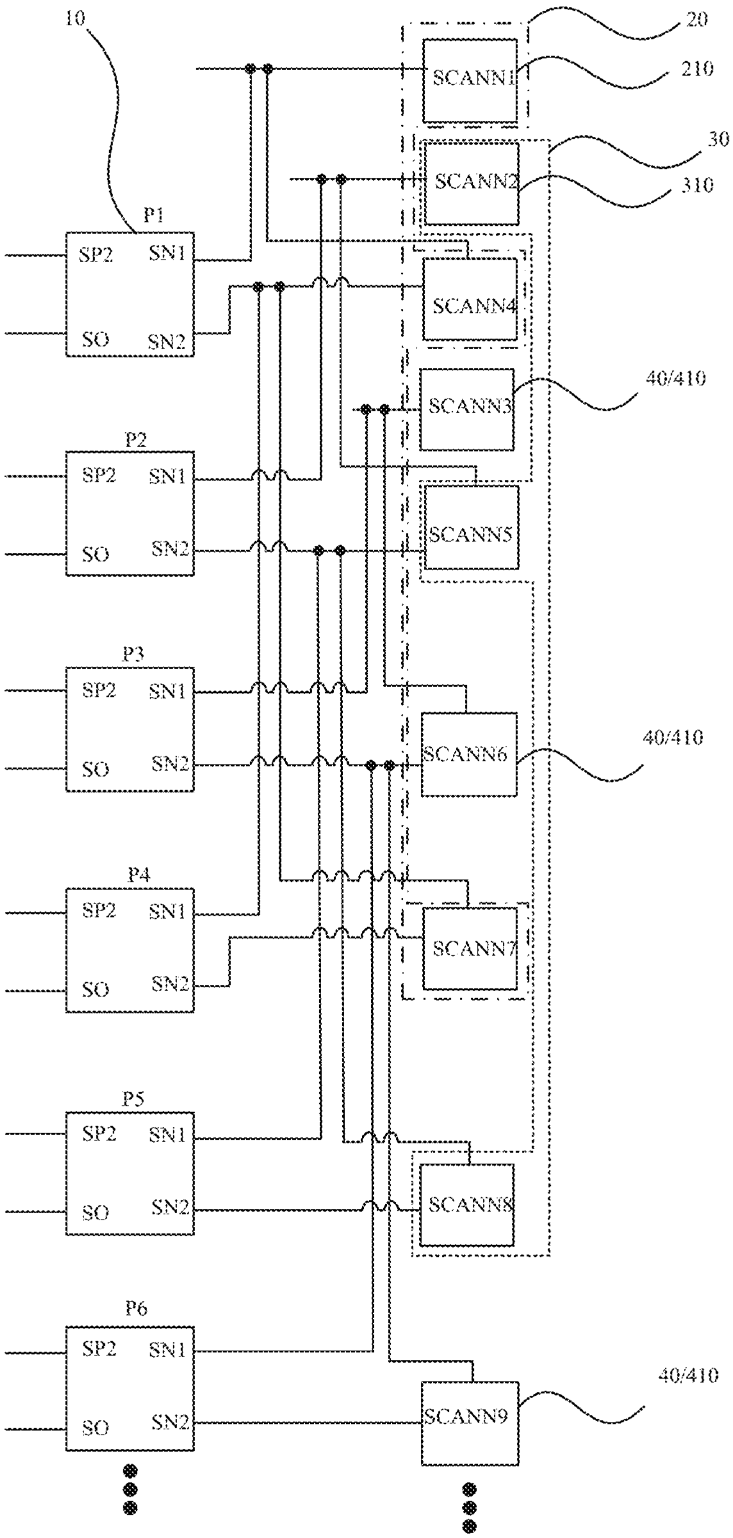
FIG. 5 is yet another schematic diagram illustrating the connection of pixel driving circuits according to an embodiment of the present disclosure.

FIG. 5 is yet another schematic diagram illustrating the connection of pixel driving circuits according to an embodiment of the present disclosure. In one or more embodiments shown in FIG. 5, the array substrate includes three groups of gate driving circuits, namely, a first gate driving circuit 20, a second gate driving circuit 30, and a third gate driving circuit 40. The third gate driving circuit 40 includes multiple cascaded third gate registers 410.

Illustratively, the first gate driving circuit 20 includes a first register SCANN1, a fourth register SCANN4, a seventh register SCANN7, and . . . . The second gate driving circuit 30 includes a second register SCANN2, a fifth register SCANN5, an eighth register SCANN8, and so on. A first one of third gate registers 410 is denoted as a third register SCANN3, a second one of third gate registers 410 is denoted as a sixth register SCANN6, and a third one of third gate registers 410 is denoted as a ninth register SCANN9. In this way, pixel driving circuits 10 in the first, fourth, seventh, . . . rows are connected to the first gate driving circuit 20, pixel driving circuits 10 in the second, fifth, eighth, . . . rows are connected to the second gate driving circuit 30, and pixel driving circuits 10 in the third, sixth, ninth, . . . rows are connected to the third gate driving circuit 40. With this configuration, the first gate driving circuit 20, the second gate driving circuit 30, and the third gate driving circuit 40 drive different rows of pixel driving circuits 10 using an interlaced row driving method. Thus, an interval of the driving time of 2 rows of pixel driving circuits exists between the gate control signals output by two adjacent first gate registers 210, an interval of the driving time of 2 rows of pixel driving circuits exists between the gate control signals output by two adjacent second gate registers 310, and an interval of the driving time of 2 rows of pixel driving circuits exists between the gate control signals output by two adjacent third gate registers 410. This configuration helps to further extend the reset duration of the first reset transistors M2 in each row of pixel driving circuits 10, ensuring that the first reset transistors M2 can be fully reset, thereby improving the reliability of the pixel driving circuits 10.

Based on the one or more preceding embodiments and with continued reference to FIG. 4, in one or more embodiments, a (j−1)-th second gate register 310 is electrically connected to a first reset control terminal SN1 of the pixel driving circuit 10 in the p-th row; the output terminal of the (j−1)-th second gate register 310 is electrically connected to the input terminal of the j-th second gate register 310, where j is a positive integer greater than 1.

Illustratively, in one or more embodiments shown in FIG. 4, k=2. In this case, the output terminal of the second register SCANN2 is electrically connected to the first reset control terminal SN1 of the second pixel driving circuit P2. The output terminal of the fourth register SCANN4 is electrically connected to both the compensation control terminal SN2 of the second pixel driving circuit P2 and the first reset control terminal SN1 of the fourth pixel driving circuit P4. The output terminal of the sixth register SCANN6 is electrically connected to the compensation control terminal SN2 of the fourth pixel driving circuit P4. Two adjacent second gate registers 310 are cascaded, where the output terminal of the second register SCANN2 is also electrically connected to the input terminal of the fourth register SCANN4, the output terminal of the fourth register SCANN4 is also electrically connected to the input terminal of the sixth register SCANN6, . . . and the output terminal of the (j−1)-th second gate register 310 is electrically connected to the input terminal of the j-th second gate register 310. As a result, after the second register SCANN2 outputs a gate control signal, the first reset control terminal SN1 of the second pixel driving circuit P2 receives the gate control signal to control the first reset transistor M2 to turn on for resetting. Subsequently, the fourth register SCANN4 outputs a gate control signal to the compensation control terminal SN2 of the second pixel driving circuit P2 to control the threshold compensation transistor M3 of the second pixel driving circuit P2 to turn on. The fourth register SCANN4 also outputs a gate control signal to the first reset control terminal SN1 of the fourth pixel driving circuit P4 to control the first reset transistor M2 of the fourth pixel driving circuit P4 to turn on . . . . Thus, by the configuration that two adjacent second gate registers 310 are cascaded, interlaced row driving of the pixel driving circuits 10 can be ensured, which in turn extends the reset duration of the first reset transistors M2 in the pixel driving circuits 10.

Based on the one or more preceding embodiments and with continued reference to FIG. 4, in one or more embodiments, the multiple cascaded first gate registers 210 and the multiple cascaded second gate registers 310 are located in the same column. Thus, the first gate driving circuit 20 and the second gate driving circuit 30 are located in the same column, occupying the space of only one group of gate driving circuits. This configuration extends the reset duration of the first reset transistors M2 in each row of pixel driving circuits 10 without increasing the width of the bezel horizontally, which is beneficial for reducing the bezel size of the array substrate, display panel, and display device. "Horizontally" refers to the row direction.

Illustratively, in one or more embodiments shown in FIG. 4, a second gate register 310 is placed between two adjacent first gate registers 210, or a first gate register 210 is placed between two adjacent second gate registers 310.

Based on the one or more preceding embodiments and with continued reference to FIG. 4, in one or more embodiments, the multiple cascaded first gate registers 210 and the multiple cascaded second gate registers 310 are alternately arranged. That is, one second gate register 310 is placed between two adjacent first gate registers 210. In this manner, the alternately arranged first gate registers 210 and second gate registers 310 drive different rows of pixel driving circuits 10 in an interlaced row driving manner. This configuration not only prevents any additional increase in bezel width horizontally but also simplifies the connection between the first gate registers 210 and the pixel driving circuits 10 as well as between the second gate registers 310 and the pixel driving circuits 10. Moreover, jumpers can be reduced.

In one or more embodiments shown in FIG. 4, the gate driving circuit including two groups of gate driving circuits is taken as an example for explanation. The first gate registers 210 are located in the odd-numbered rows, and the second gate registers 310 are located in the even-numbered rows. Moreover, the first gate registers 210 drive the pixel driving circuits 10 in the odd-numbered rows (first pixel driving circuit P1 and third pixel driving circuit P3). The second gate registers 310 drive the pixel driving circuits 10 in the even-numbered rows (second pixel driving circuit P2 and fourth pixel driving circuit P4). This arrangement simplifies the connection between the first gate registers 210 and the pixel driving circuits 10 in the odd-numbered rows, as well as the connection between the second gate registers 310 and the pixel driving circuits 10 in the even-numbered rows.

Figure 6:
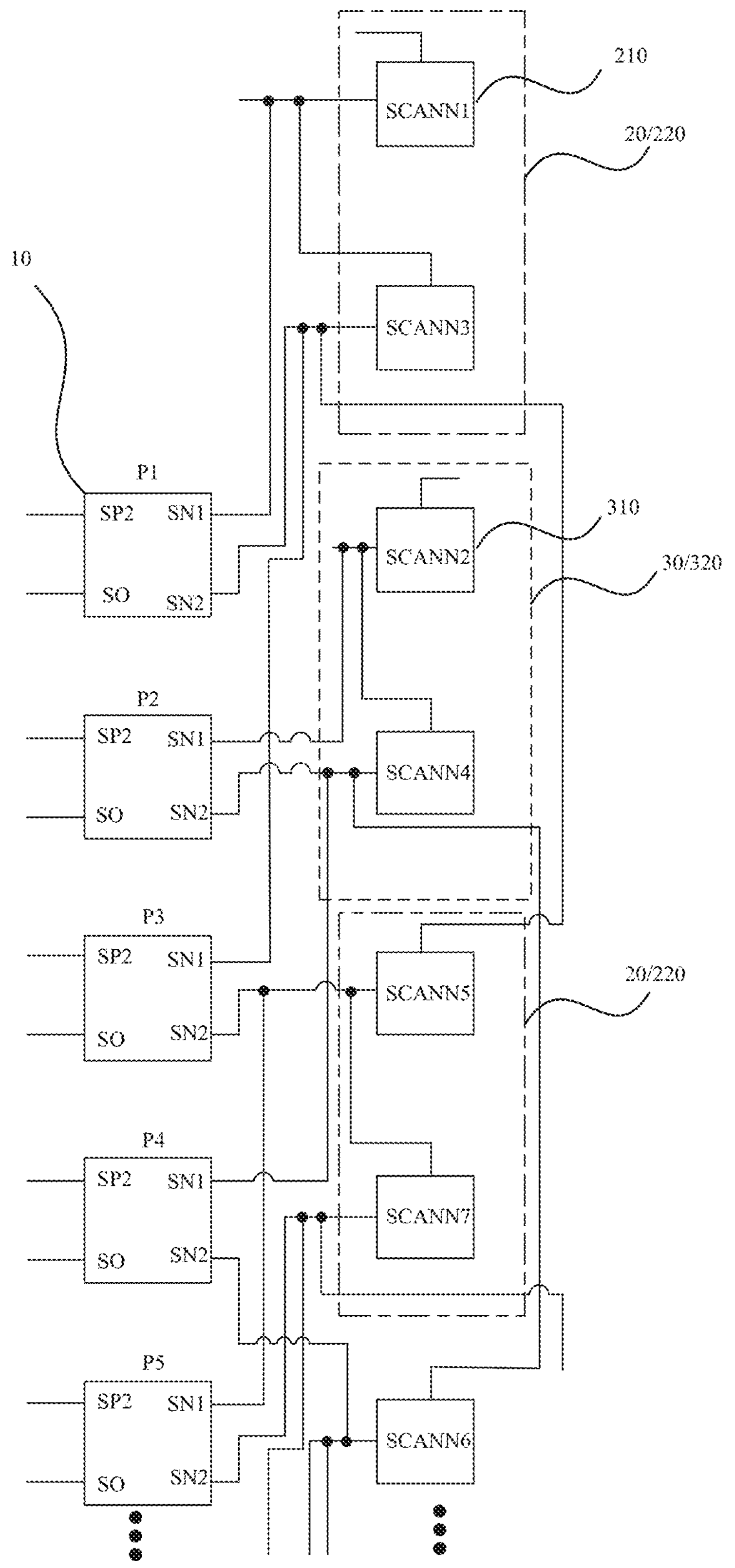
FIG. 6 is yet another schematic diagram illustrating the connection of pixel driving circuits according to an embodiment of the present disclosure.

FIG. 6 is yet another schematic diagram illustrating the connection of pixel driving circuits according to an embodiment of the present disclosure. With reference to FIG. 6, in one or more embodiments, the first gate driving circuit 20 includes a first gate register group 220, the first gate register group 220 includes m cascaded first gate registers 210; the second gate driving circuit 30 includes a second gate register group 320, and the second gate register group 320 includes m cascaded second gate registers 310; where m is a positive integer greater than 1. The first gate register group 220 and the second gate register group 320 are alternately arranged. Thus, the first gate driving circuit 20 includes at least one first gate register group 220, and the second gate driving circuit 30 includes at least one second gate register group 320. By inserting the first gate register group 220 and the second gate register group 320 in alternate rows, the first gate driving circuit 20 and the second gate driving circuit 30 occupy the space of only one column of gate driving circuits. This configuration extends the reset duration of the first reset transistors M2 in each row of pixel driving circuits 10 without increasing the width of the bezel horizontally, which is beneficial for reducing the bezel size of the array substrate, display panel, and display device.

As shown in one or more embodiments in FIG. 6, an example where m=2 is used for illustration. The first gate driving circuit 20 includes multiple first gate register groups 220, and each first gate register group includes two first gate registers 210. The second gate driving circuit 30 includes multiple second gate register groups 320, and each second gate register group includes two second gate registers 310. One second gate register group 320 is located between two adjacent first gate register groups 220, or one first gate register group 220 is located between two adjacent second gate register groups 320.

Figure 7:
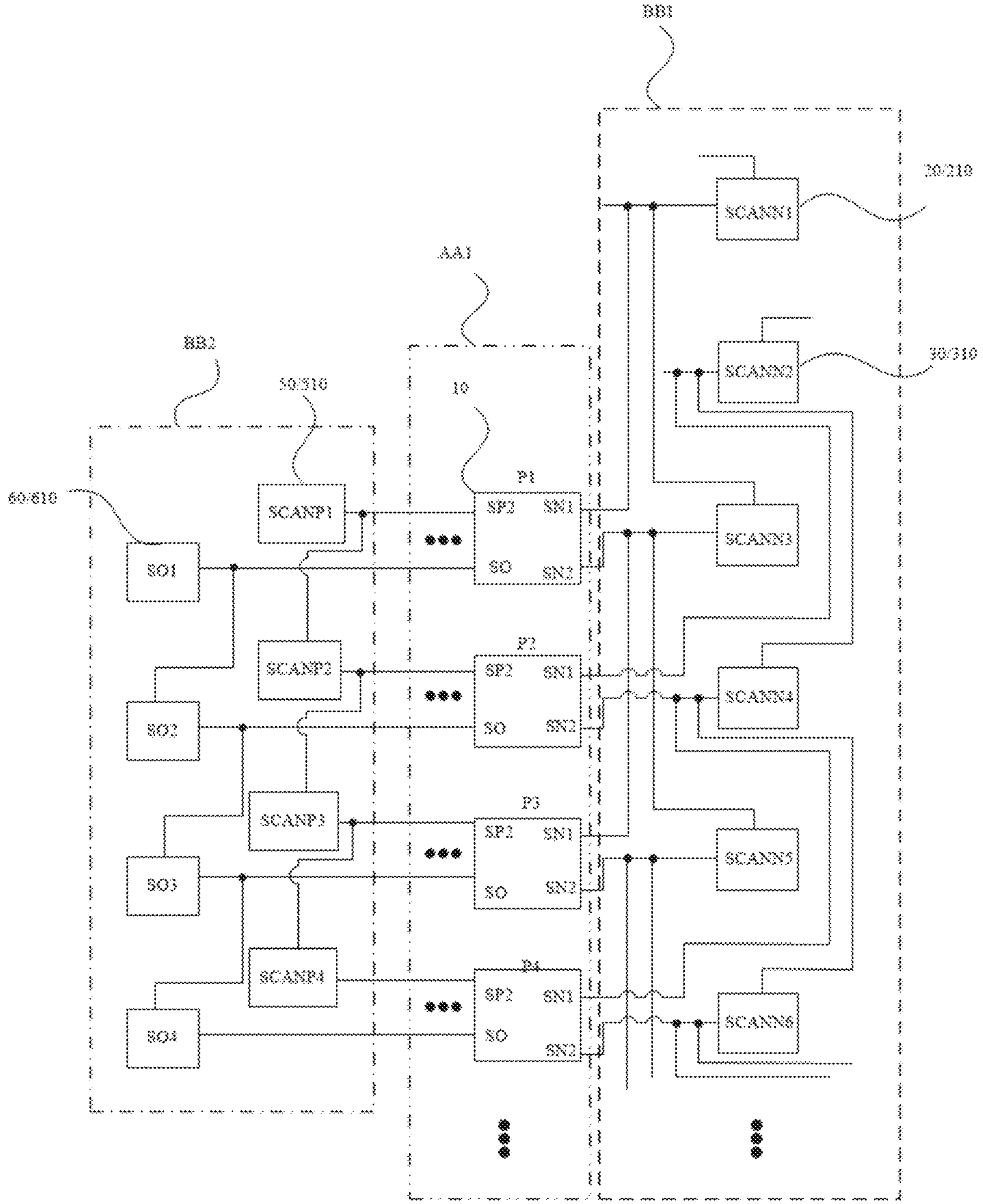
FIG. 7 is yet another schematic diagram illustrating the connection of pixel driving circuits according to an embodiment of the present disclosure.

FIG. 7 is yet another schematic diagram illustrating the connection of pixel driving circuits according to an embodiment of the present disclosure. With reference to FIG. 7, in one or more embodiments, the array substrate includes a display region AA1, a first bezel region BB1, and a second bezel region BB2. The first bezel region BB1 and the second bezel region BB2 are located on opposite sides of the display region AA1, respectively. The display region AA1 includes multiple pixel driving circuits 10, and the first bezel region BB1 includes the first gate driving circuit 20. It should be noted that in FIG. 7, the areas of the first bezel region BB1 and the second bezel region BB2 are enlarged, and the area of the display region AA1 is reduced to better illustrate the connection relationship between the pixel driving circuits 10 and the circuits in the first bezel region BB1 and the second bezel region BB2. It can be understood by those skilled in the art that the area of the display region AA1 is much larger than the areas of the first bezel region BB1 and the second bezel region BB2.

Illustratively, as shown in one or more embodiments in FIG. 7, the display region AA1 includes pixel driving circuits 10 arranged in an array, and the pixel driving circuits 10 are electrically connected to corresponding light-emitting elements (not shown in the figure), thereby driving the light-emitting elements to emit light and achieving the display of images in the display region AA1. The first bezel region BB1 is located on the right side of the display region AA1, the second bezel region BB2 is located on the left side of the display region AA1, and the first bezel region BB1 and the second bezel region BB2 are arranged opposite to each other. The first gate driving circuit 20 is located in the first bezel region BB1. Multiple cascaded first gate registers 210 in the first gate driving circuit 20 are electrically connected to the first reset control terminals SN1 and the compensation control terminals SN2 in the pixel driving circuits 10, providing gate control signals to the pixel driving circuits 10 to ensure the normal operation of the pixel driving circuits 10.

It should be noted that in FIG. 7, the first gate driving circuit 20 is located in the first bezel region BB1, which is merely taken as an example for illustration rather than limited thereto. In other embodiments, when the gate driving circuit includes the first gate driving circuit 20 and the second gate driving circuit 30, both the first gate driving circuit 20 and the second gate driving circuit 30 are located in the first bezel region BB1 and are both in the same column, thereby reducing the width of the first bezel region BB1 in the horizontal direction, which is conducive to reducing the bezel size of the array substrate, the display panel, and the display device.

Based on the one or more preceding embodiments and with continued reference to FIG. 7, the array substrate also includes a row driving circuit 50 and a first scan driving circuit 60. The row driving circuit 50 includes multiple cascaded row registers 510, and the first scan driving circuit 60 includes multiple cascaded first scan registers 610. The second bezel region BB2 includes the row driving circuit 50 and/or the first scan driving circuit 60.

Illustratively, in one or more embodiments shown in FIG. 7, the row driving circuit 50 and the first scan driving circuit 60 are both located in the second bezel region BB2. Multiple cascaded row registers 510 in the row driving circuit 50 provide row control signals (data write control signals) to the pixel driving circuits 10. Multiple cascaded first scan registers 610 in the first scan driving circuit 60 provide scan control signals (second reset control signals) to the pixel driving circuits 10. Then, the row driving circuit 50 providing row scan signals and the first scan driving circuit 60 providing scan control signals are arranged in the second bezel region BB2, and the gate driving circuit (such as the first gate driving circuit 20 and the second gate driving circuit 30) providing gate control signals are arranged in the first bezel region BBT. Thus, the connection between the circuits in the same bezel region and the pixel driving circuits 10 in the display region AA1 is simplified.

It should be noted that, in FIG. 7, the array substrate includes one group of row driving circuits 50, and the row driving circuits 50 is located in the second bezel region BB2, which is merely taken as an example for illustration rather than limited thereto. In other embodiments, the array substrate may also include two groups of row driving circuits 50 located in the first bezel region BB1 and the second bezel region BB2, respectively, that is, dual-side driving, thereby enhancing the driving capability of the row driving circuits 50.

Figure 8:
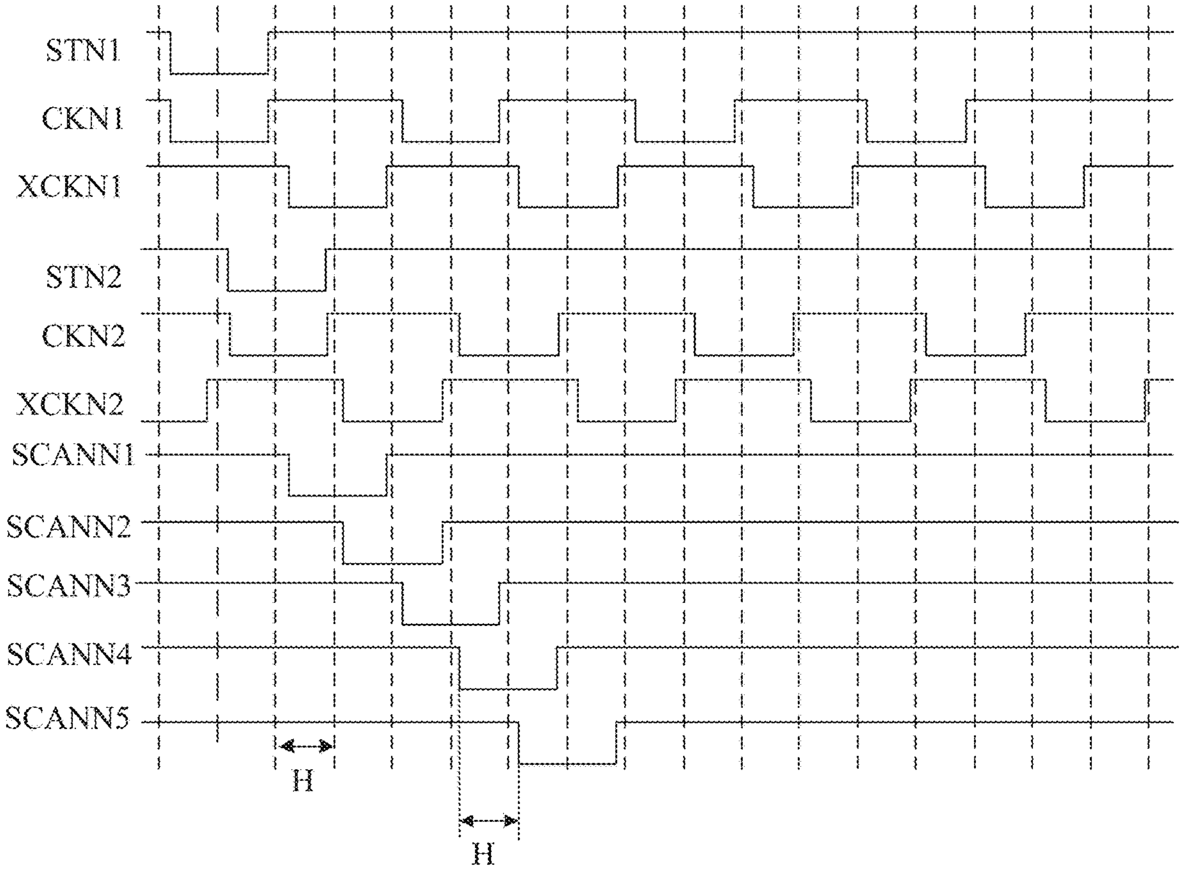
FIG. 8 is a timing diagram of pixel driving circuits according to an embodiment of the present disclosure.

FIG. 8 is a timing diagram of pixel driving circuits according to an embodiment of the present disclosure. In one or more embodiments, with reference to FIG. 1, FIG. 4, and FIG. 8, the multiple cascaded first gate registers 210 or the multiple cascaded second gate registers 310 sequentially output multiple gate control signals. Gate control signals received by the first reset control terminal SN1 include a first-type gate control signal, and gate control signals received by the compensation control terminal SN2 include a second-type gate control signal. In a display cycle, for a pixel driving circuit 10, a starting moment of each of (h−1) gate control signals is located between a starting moment of a first-type gate control signal and a starting moment of a second-type gate control signal.

In one or more embodiments as shown in FIG. 4 and FIG. 8, an example where h=2 is used for illustration. The first gate driving circuit 20 includes a first register SCANN1, a third register SCANN3, a fifth register SCANN5, and . . . . The second gate driving circuit 30 includes a second register SCANN2, a fourth register SCANN4, and . . . . The driving sequence of the first gate driving circuit 20 and the second gate driving circuit 30 is as follows: the first register SCANN1, the second register SCANN2, the third register SCANN3, the fourth register SCANN4, the fifth register SCANN5, . . . sequentially output gate control signals. The gate control signals include a first-type gate control signal (first reset control signals) received by the first reset control terminals SN1 and a second-type gate control signal (compensation control signals) received by the compensation control terminals SN2. In this way, after the first register SCANN1 outputs a first-type gate control signal to the first pixel driving circuit P1, the second register SCANN2 outputs a first-type gate control signal to the second pixel driving circuit P2. Next, the third register SCANN3 outputs a second-type gate control signal to the first pixel driving circuit P1 and outputs a first-type gate control signal to the third pixel driving circuit P3. Subsequently, the fourth register SCANN4 outputs a second-type gate control signal to the second pixel driving circuit P2 and outputs a first-type gate control signal to the fourth pixel driving circuit P4 . . . . In this manner, the falling edge (starting moment) of the first-type gate control signal received by the first reset control terminal SN1 of the same pixel driving circuit 10 is separated by the falling edge of one (i.e., h−1=1) gate control signal from the falling edge of the second-type gate control signal received by the compensation control terminal SN2. For example, the first-type gate control signal of the first register SCANN1 received by the first pixel driving circuit P1 is separated from the second-type gate control signal of the third register SCANN3 by the driving time of the gate control signal output by one register (the second register SCANN2). This method extends the reset duration of the first reset transistor M2 in the pixel driving circuit 10, ensuring that the first reset transistor M2 can be fully reset, thereby improving the reliability of the pixel driving circuit 10.

Figure 9:
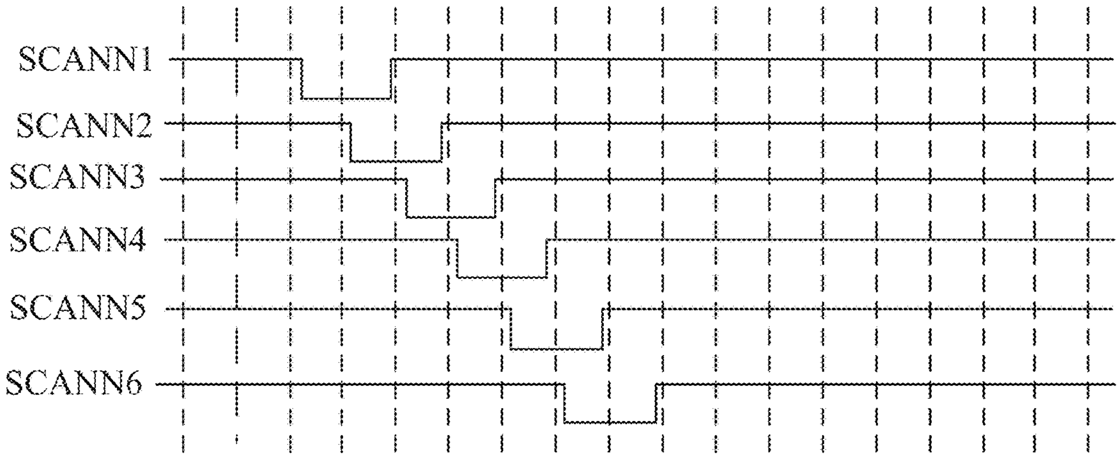
FIG. 9 is another timing diagram of pixel driving circuits according to an embodiment of the present disclosure.

It should be noted that in FIG. 8, h=2 is merely illustrated as an example rather than limited thereto. FIG. 9 is another timing diagram of pixel driving circuits according to an embodiment of the present disclosure. In one or more embodiments shown in FIG. 5 and FIG. 9, an example where h=3 is used for illustration. The first gate driving circuit 20 includes a first register SCANN1, a fourth register SCANN4, and . . . . The second gate driving circuit 30 includes a second register SCANN2, a fifth register SCANN5, and . . . . The third gate driving circuit 40 includes a third register SCANN3, a sixth register SCANN6, and . . . . The driving sequence of the first gate driving circuit 20, the second gate driving circuit 30, and the third gate driving circuit 40 is as follows: The first register SCANN1, the second register SCANN2, the third register SCANN3, the fourth register SCANN4, the fifth register SCANN5, the sixth register SCANN6, . . . sequentially output gate control signals. In this manner, the falling edge (starting moment) of the first-type gate control signal received by the first reset control terminal SN1 of the same pixel driving circuit 10 is separated by the falling edges of 2 (h−1) gate control signals from the falling edge of the second-type gate control signal received by the compensation control terminal SN2. For example, the first-type gate control signal of the first register SCANN1 received by the first pixel driving circuit P1 is separated from the second-type gate control signal of the fourth register SCANN4 by the driving time of the gate control signals output by two registers (the second register SCANN2 and the third register SCANN3). This method extends the reset duration of the first reset transistor M2 in the pixel driving circuit 10, ensuring that the first reset transistor M2 can be fully reset, thereby improving the reliability of the pixel driving circuit 10.

Based on the one or more preceding embodiments and with continued reference to FIG. 8, in a display cycle, starting moments of gate control signals received by pixel driving circuits in adjacent rows are spaced by an interval of H. H is the row duration of the pixel driving circuits 10 at the current driving frequency f, H=1/(f×b); and b is the number of rows of the pixel driving circuits.

In one or more embodiments shown in FIG. 4 and FIG. 8, the first register SCANN1 provides a first-type gate control signal to the first pixel driving circuit P1. The second register SCANN2 provides a first-type gate control signal to the second pixel driving circuit P2. The third register SCANN3 provides a second-type gate control signal to the first pixel driving circuit P1 as well as a first-type gate control signal to the third pixel driving circuit P3. The fourth register SCANN4 provides a second-type gate control signal to the second pixel driving circuit P2 as well as a first-type gate control signal to the fourth pixel driving circuit P4. Then, the first-type gate control signal or the second-type gate control signal received by pixel driving circuits in adjacent rows comes from the adjacent first gate register 210 (such as the first register SCANN1) and the second gate register 310 (such as the second register SCANN2), respectively.

It should be noted that in FIG. 8, illustratively, the gate control signals output by the first gate register 210 and the second gate register 310 are controlled by clock signals. For example, the duration of the gate control signal output by the first gate register 210 (such as the first register SCANN1 and the third register SCANN3) is controlled by a first signal STN1, a first clock signal CKN1, and a second clock signal XCKN1, while the duration of the gate control signal output by the second gate register 310 (such as the second register SCANN2 and the fourth register SCANN4) is controlled by a second signal STN2, a third clock signal CKN2, and a fourth clock signal XCKN2. However, the present disclosure is not limited to this, and those skilled in the art may make adjustments as needed.

Based on the one or more preceding embodiments and with continued reference to FIG. 8, in one or more embodiments, in a display cycle, scan control signals received by pixel driving circuits in adjacent rows overlap. The gate control signals received by pixel driving circuits in adjacent rows are the gate control signals output by the adjacent first gate register 210 and second gate register 310. Since the first gate register 210 is located in the first gate driving circuit 20 and the second gate register 310 is located in the second gate driving circuit 30, the operation of the first gate driving circuit 20 and the second gate driving circuit 30 does not affect each other. Consequently, the gate control signals output by the adjacent first gate register 210 and second gate register 310 are configured to overlap so that when the first gate register 210 outputs a gate control signal, the second gate register 310 also outputs a gate control signal. For example, when the second register SCANN2 outputs a first-type gate control signal to the second pixel driving circuit P2, the third register SCANN3 outputs a second-type gate control signal to the first pixel driving circuit P1 (that is, while the first reset transistor M2 of the second pixel driving circuit P2 is controlled to reset the gate of the drive transistor M1, data compensation and data signal writing may also be performed on the threshold compensation transistor M3 in the first pixel driving circuit P1.) This configuration improves the time utilization efficiency of the first gate register 210 and the second gate register 310.

Based on the one or more preceding embodiments and with continued reference to FIG. 8, in one or more embodiments, the multiple gate control signals include the first-type gate control signal. In a display cycle, the starting moment of at least one gate control signal is located between the starting moment of the first-type gate control signal and the cut-off moment of the first-type gate control signal.

In one or more embodiments shown in FIG. 4 and FIG. 8, an example where h=2 is used for illustration. Since an interval of the driving time of one (i.e., h−1=1) row of pixel driving circuits exists between the first-type gate control signals output by two adjacent first gate registers 210, the falling edge of at least one gate control signal may be set between the falling edge (starting moment) of the first-type gate control signal received by the first reset control terminal SN1 of the same pixel driving circuit and the rising edge (cut-off time) of the received first-type gate control signal. In this manner, the duration of the first-type gate control signal is greater than 1 H. This duration, compared to the duration of 1 H in the related art, can extend the reset duration of the first reset transistor M2 in the pixel driving circuit 10. This configuration has better application scenarios in display panels with shorter H periods, such as high-frequency display panels and most large-sized panels.

It can be understood that the duration of the first-type gate control signals output by the first gate register 210 and the second gate register 310 may be controlled to be greater than 1 H using clock signals. In one or more embodiments, when h=2, the duration of the first-type gate control signal may be set to 2 H.

Figure 10:
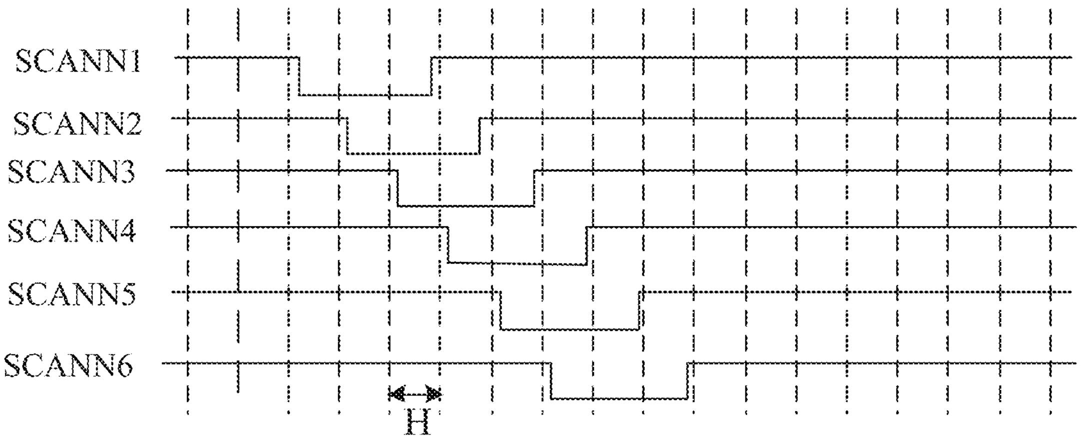
FIG. 10 is another timing diagram of pixel driving circuits according to an embodiment of the present disclosure.

FIG. 10 is another timing diagram of pixel driving circuits according to an embodiment of the present disclosure. With reference to FIG. 1, FIG. 5, and FIG. 10, in one or more embodiments, in a display cycle, the starting moments of at most (h−1) gate control signals is located between the starting moment of the first-type gate control signal and the cut-off moment of the first-type gate control signal.

In one or more embodiments shown in FIG. 5 and FIG. 10, an example where h=3 is used for illustration. Since an interval of the driving time of 2 (h−1) rows of pixel driving circuits exists between the first-type gate control signals output by two adjacent first gate registers 210, the falling edges of at most 2 (h−1) gate control signals may be set between the falling edge (starting moment) of the first-type gate control signal received by the first reset control terminal SN1 of the same pixel driving circuit and the rising edge (cut-off time) of the received first-type gate control signal. In this manner, the duration of the first-type gate control signal is at most 3 H. On the basis of ensuring the normal progressive row driving of the pixel driving circuit through the first gate driving circuit 20, the second gate driving circuit 30, and the third gate driving circuit 40, the reset duration of the first reset transistor M2 in the pixel driving circuit 10 is further extended.

Based on the one or more preceding embodiments and with continued reference to FIG. 1 and FIG. 7, in one or more embodiments, each pixel driving circuit 10 also includes a data write transistor M6. A first electrode of the data write transistor M6 is electrically connected to a second electrode of the drive transistor M1, and a gate of the data write transistor M6 is electrically connected to a data write control terminal SP2. The array substrate also includes a row driving circuit 50. The row driving circuit 50 includes multiple cascaded row registers 510. The output terminal of a row register 510 is electrically connected to the data write control terminal SP2.

Illustratively, in one or more embodiments shown in FIG. 1, the data write transistor M6 is located on the writing path of a data signal and is used to write the data signal to the drive transistor M1 to control the operating state of the drive transistor M1, thereby regulating the magnitude of the drive current and controlling the brightness of the light-emitting element 30. In one or more embodiments, a second electrode of the data write transistor M6 is electrically connected to a data signal input terminal Data, the first electrode of the data write transistor M6 is electrically connected to both the first capacitor plate of the storage capacitor Cst and the second electrode of the drive transistor M1, and the gate of the data write transistor M6 is electrically connected to the data write control terminal SP2. Under the control of the row control signal provided by the data write control terminal SP2, the data write transistor M6 writes the data signal from the data signal input terminal Data to the second electrode of the drive transistor M1 and the first capacitor plate of the storage capacitor Cst.

In one or more embodiments shown in FIG. 7, the row driving circuit 50 includes multiple cascaded row registers 510. A first row register 510 is denoted as a first row register SCANP1. A second row register 510 is denoted as a second row register SCANP2. A third row register 510 is denoted as a third row register SCANP3. A fourth row register 510 is denoted as a fourth row register SCANP4 . . . . The first row register SCANP1 is electrically connected to the data write control terminal SP2 of the first pixel driving circuit P1. The second row register SCANP2 is electrically connected to the data write control terminal SP2 of the second pixel driving circuit P2. The third row register SCANP3 is electrically connected to the data write control terminal SP2 of the third pixel driving circuit P3 . . . . In other words, the pixel driving circuit in each row adopts one row register 510 for progressive row driving. As a result, the number of row registers 510 connected to the pixel driving circuit 10 is reduced, which can decrease the parasitic capacitance of the row register 510 (mainly the parasitic capacitance between the gate and the source/drain of the transistor in the row register 510). Consequently, the delay in the row control signal output by the row register 510 is reduced, thereby enhancing the reliability of the pixel driving circuit 10.

Figure 11:
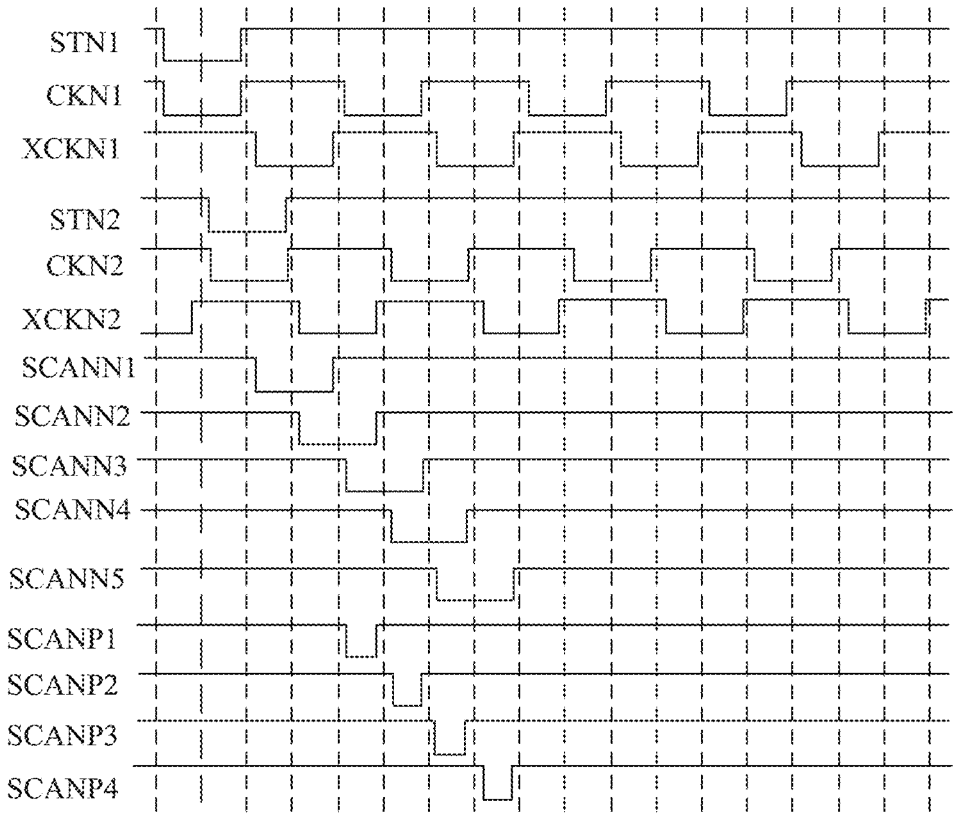
FIG. 11 is another timing diagram of pixel driving circuits according to an embodiment of the present disclosure.

FIG. 11 is another timing diagram of pixel driving circuits according to an embodiment of the present disclosure. With reference to FIG. 1, FIG. 7, and FIG. 11, in one or more embodiments, the multiple cascaded row registers 510 sequentially output multiple row control signals. In a display cycle, for one pixel driving circuit 10, a cut-off moment of a row control signal is prior to a cut-off moment of the second-type gate control signal.

In one or more embodiments shown in FIG. 1 and FIG. 7, an example where h=2 is used for illustration. In this case, the first reset control terminal SN1 of the third pixel driving circuit P3 is electrically connected to the third register SCANN3, the compensation control terminal SN2 is electrically connected to the fifth register SCANN5, and the data write control terminal SP2 is electrically connected to the third row register SCANP3. For the third pixel driving circuit P3, the rising edge (cut-off time) of the row control signal output from the third row register SCANP3 occurs prior to the rising edge (cut-off time) of the second-type gate control signal output from the third register SCANN3 so that the closing time of the data write transistor M6 in the third pixel driving circuit P3 is later than the closing time of the threshold compensation transistor M3. Consequently, when a parasitic capacitance exists at node N1, even if the data write transistor M6 is turned off, the voltage maintained by the parasitic capacitance can continue to be written to node N2 due to the continued conduction of the threshold compensation transistor M3, thereby extending the compensation time and effectively ensuring the write time.

Figure 12:
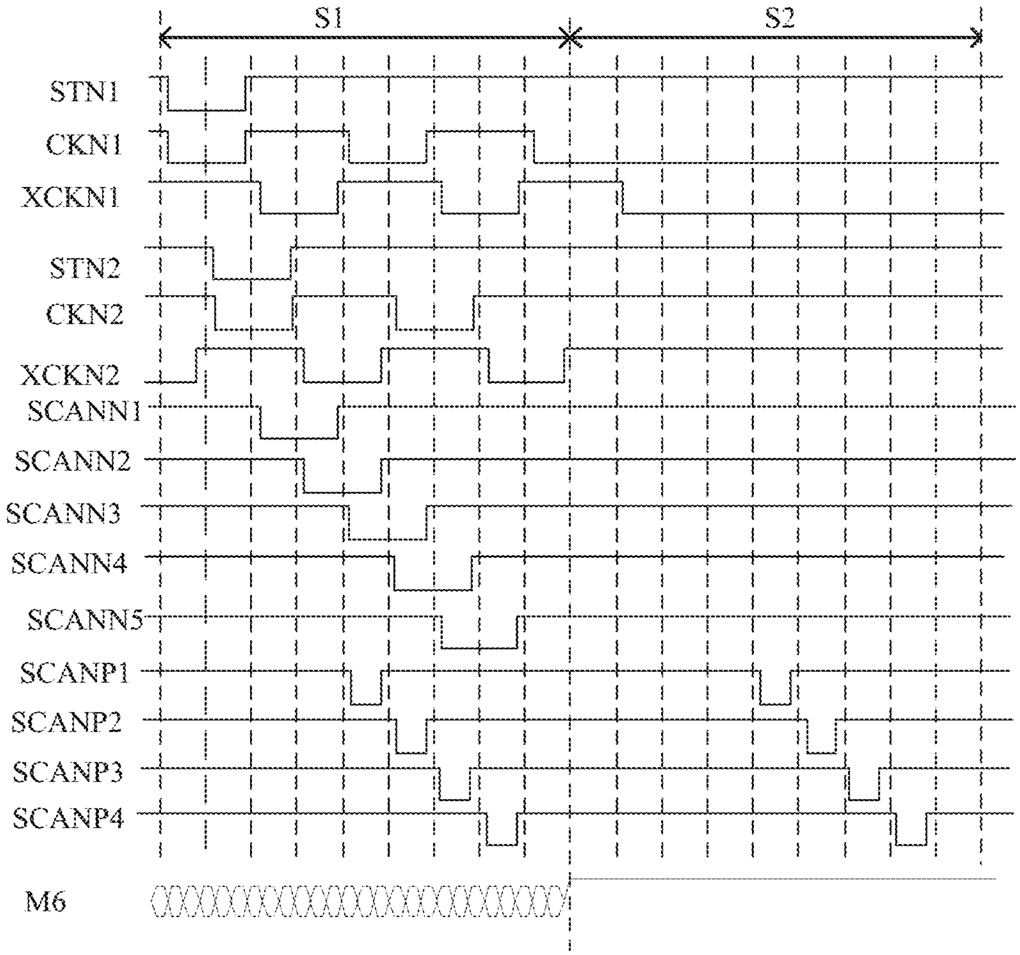
FIG. 12 is yet another timing diagram of pixel driving circuits according to an embodiment of the present disclosure.

FIG. 12 is yet another timing diagram of pixel driving circuits according to an embodiment of the present disclosure. With reference to FIG. 7 and FIG. 12, in one or more embodiments, the display cycle includes a writing stage S1 and a holding stage S2. The multiple cascaded row registers 510 sequentially output multiple row control signals. During the writing stage S1, a row control signal controls the data write transistor M6 to write a data signal to the gate of the drive transistor M1. During the holding stage S2, the row control signal controls the data write transistor M6 to write a fixed voltage signal to the second electrode of the drive transistor M1.

Illustratively, in one or more embodiments shown in FIG. 12, multiple cascaded row registers 510 during the writing stage S1 and the holding stage S2 output row control signals to the data write control terminals SP2 of the pixel driving circuit in each row to control the data write transistor M6 in the pixel driving circuit in each row to turn on sequentially. Consequently, during the writing stage S1, when the data write transistor M6 is turned on, the data signal is written to the gate of the drive transistor M1 to control the operating state of the drive transistor M1, thereby controlling the magnitude of the drive current and the brightness of the light-emitting element DL. During the holding stage S2, when the data write transistor M6 is turned on, a fixed voltage signal is written to the second electrode of the drive transistor M1, thus enabling low-frequency display of the display panel.

It should be noted that during the writing stage S1, the first gate driving circuit 20 and the second gate driving circuit 30 provide gate control signals to the pixel driving circuit 10. However, during the holding stage S2, the first gate driving circuit 20 and the second gate driving circuit 30 no longer provide gate control signals to the pixel driving circuit 10.

Figure 13:
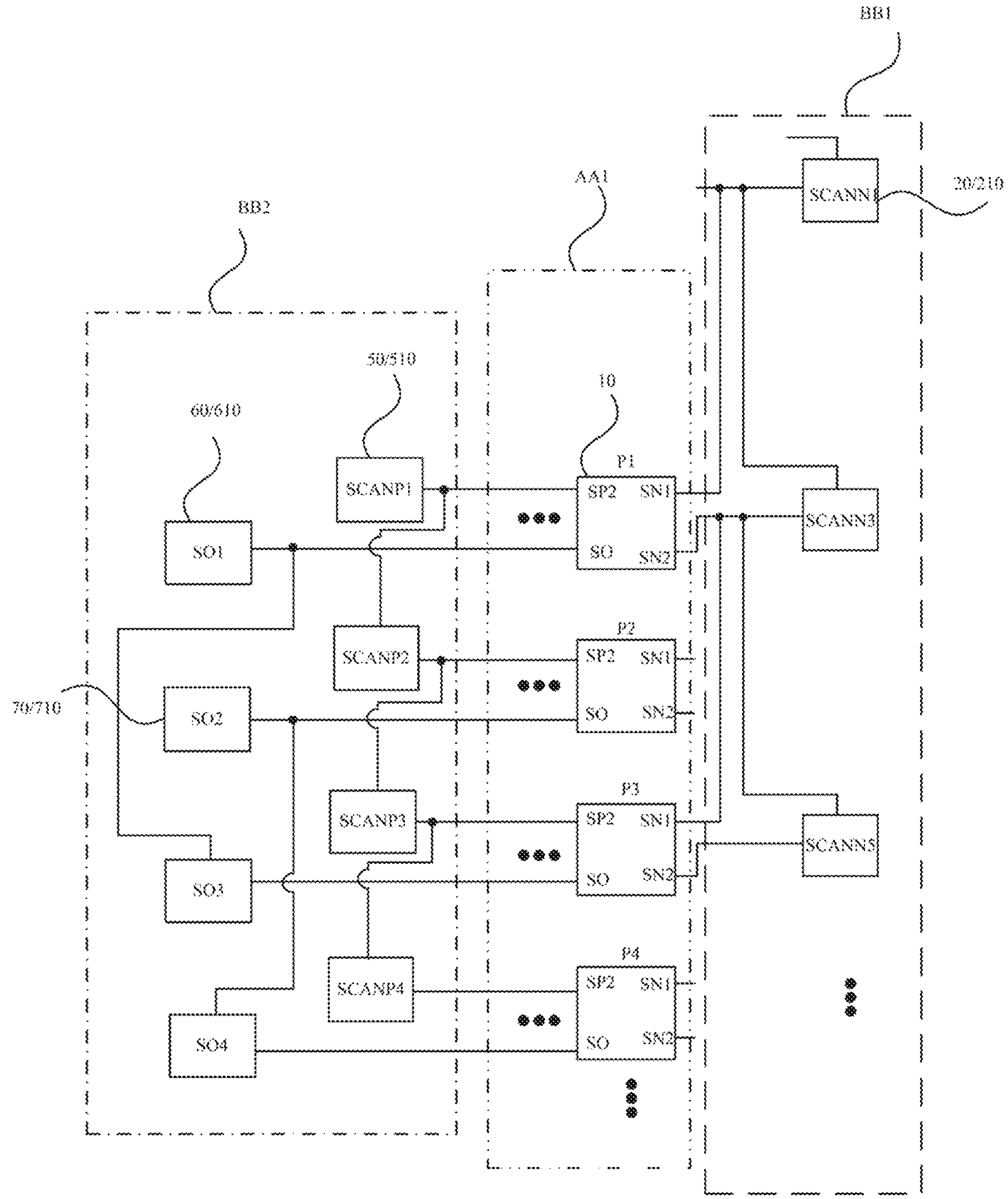
FIG. 13 is yet another schematic diagram illustrating the connection of pixel driving circuits according to an embodiment of the present disclosure.

FIG. 13 is yet another schematic diagram illustrating the connection of pixel driving circuits according to an embodiment of the present disclosure. With reference to FIG. 1 and FIG. 13, in one or more embodiments, each pixel driving circuit 10 also a second reset transistor M7, a first electrode of the second reset transistor M7 is electrically connected to a first electrode of a light-emitting element LD, and a gate of the second reset transistor M7 is electrically connected to a second reset control terminal SO. The array substrate also includes a first scan driving circuit 60. The first scan driving circuit 60 includes multiple cascaded first scan registers 610. The output terminal of a first scan register 610 is electrically connected to the second reset control terminal SO.

Illustratively, in one or more embodiments shown in FIG. 1, the first electrode of the second reset transistor M7 is electrically connected to the first electrode of the light-emitting element LD, a second electrode of the second reset transistor M7 is electrically connected to a second reference signal terminal VREF2, and the gate of the second reset transistor M7 is electrically connected to the second reset control terminal SO. Consequently, under the control of the scan control signal output from the second reset control terminal SO, the second reset transistor M7 resets the anode of the light-emitting element LD, thereby preventing the influence on the light-emitting element LD's emission in the next frame. In one or more embodiments shown in FIG. 13, the first scan driving circuit 60 is located in the second bezel region BB1 and includes multiple first scan registers 610. The multiple first scan registers 610 provide scan control signals to the second reset control terminals SO of the pixel driving circuits 10, ensuring the normal operation of the pixel driving circuits 10.

Based on the one or more preceding embodiments and with continued reference to FIG. 13, the output terminal of a q-th first scan register 610 is electrically connected to the input terminal of a (q+1)-th first scan register 610, where q is a positive integer.

Illustratively, in one or more embodiments shown in FIG. 13, a first scan register 610 is denoted as a first scan shift register SO1, a second scan register 610 is denoted as a third scan shift register SO3, and . . . . The output terminal of the first scan shift register SO1 is electrically connected to the second reset control terminal SO of the first pixel driving circuit PT. The output terminal of the third scan shift register SO3 is electrically connected to the second reset control terminal SO of the third pixel driving circuit P3. Furthermore, the output terminal of the first scan shift register SO1 is also electrically connected to the input terminal of the third scan shift register SO3. Consequently, the first scan shift register SO1 outputs a scan control signal to the second reset control terminal SO of the first pixel driving circuit P1, and after an interval of the driving time of one row of pixel driving circuits, the third scan shift register SO3 outputs a scan control signal to the second reset control terminal SO of the third pixel driving circuit P3. In this manner, since an interval of the driving time of 1 row of pixel driving circuits exists between the scan control signals output by two adjacent first scan registers 610, that is, interlaced row driving, the reset duration of the second reset transistor M7 in the pixel driving circuit 10 driven in an interlaced row driving manner can be extended, ensuring that the second reset transistor M7 can be fully reset and improving the reliability of the pixel driving circuit 10.

Based on the one or more preceding embodiments and with continued reference to FIG. 13, in one or more embodiments, the array substrate also includes a second scan driving circuit 70, the second scan driving circuit 70 includes multiple cascaded second scan registers 710, and the output terminal of a second scan register 710 is electrically connected to the second reset control terminal SO. The multiple cascaded first scan registers 610 and the multiple cascaded second scan registers 620 are located in the same column.

In one or more embodiments shown in FIG. 13, the array substrate includes a first scan driving circuit 60 and a second scan driving circuit 70. Both the first scan driving circuit 60 and the second scan driving circuit 70 are located in the second bezel region BB2. A first scan driving circuit 60 includes a first scan shift register SO1, a third scan shift register SO3, and so on. A first one of the second scan registers 710 is denoted as a second scan shift register SO2. A second one of the second scan registers 710 is denoted as a fourth scan shift register SO4, and so on. The output terminal of the second scan shift register SO2 is electrically connected to the second reset control terminal SO of the second pixel driving circuit P2, and the output terminal of the fourth scan shift register SO4 is electrically connected to the second reset control terminal SO of the fourth pixel driving circuit P4. Additionally, the output terminal of the second scan shift register SO2 is also electrically connected to the input terminal of the fourth scan shift register SO4. In this manner, since an interval of the driving time of one row of pixel driving circuits exists between the scan control signals output by two adjacent second scan registers 710, that is, interlaced row driving, the reset duration of the second reset transistor M7 in the pixel driving circuit 10 driven in an interlaced row driving manner can be extended, ensuring that the second reset transistor M7 can be fully reset and improving the reliability of the pixel driving circuit 10.

The driving methods for both the first scan driving circuit 60 and the second scan driving circuit 70 are interlaced row driving, and the first scan driving circuit 60 and the second scan driving circuit 70 drive pixel driving circuits 10 in different rows. Furthermore, in one or more embodiments shown in FIG. 13, the first scan driving circuit 60 drives odd-numbered rows of pixel driving circuits 10, while the second scan driving circuit 70 drives even-numbered rows of pixel driving circuits 10. That is, pixel driving circuits 10 in the first, third, fifth, . . . rows are connected to the first scan driving circuit 60, and the pixel driving circuits 10 in the second, fourth, sixth, . . . rows are connected to the second scan driving circuit 70. In this manner, an interval of the driving time of one row of pixel driving circuits exists between the scan control signals output by two adjacent first scan registers 610 as well as between the scan control signals output by two adjacent second scan registers 710, and thus the reset duration for the second reset transistor M7 in each row of pixel driving circuits 10 can be extended, ensuring that the second reset transistor M7 can be fully reset and improving the reliability of the pixel driving circuit 10. Furthermore, the multiple first scan registers 610 and the multiple second scan registers 710 are located in the same column. That is, the first scan driving circuit 60 and the second scan driving circuit 70 are located in the same column, and the first scan registers 610 and the second scan registers 710 occupy the space of only one column of scan driving circuits. This configuration extends the reset duration of the second reset transistors M7 in each row of pixel driving circuits 10 without increasing the width of the bezel horizontally, which is beneficial for reducing the bezel size of the array substrate, display panel, and display device.

Figure 14:
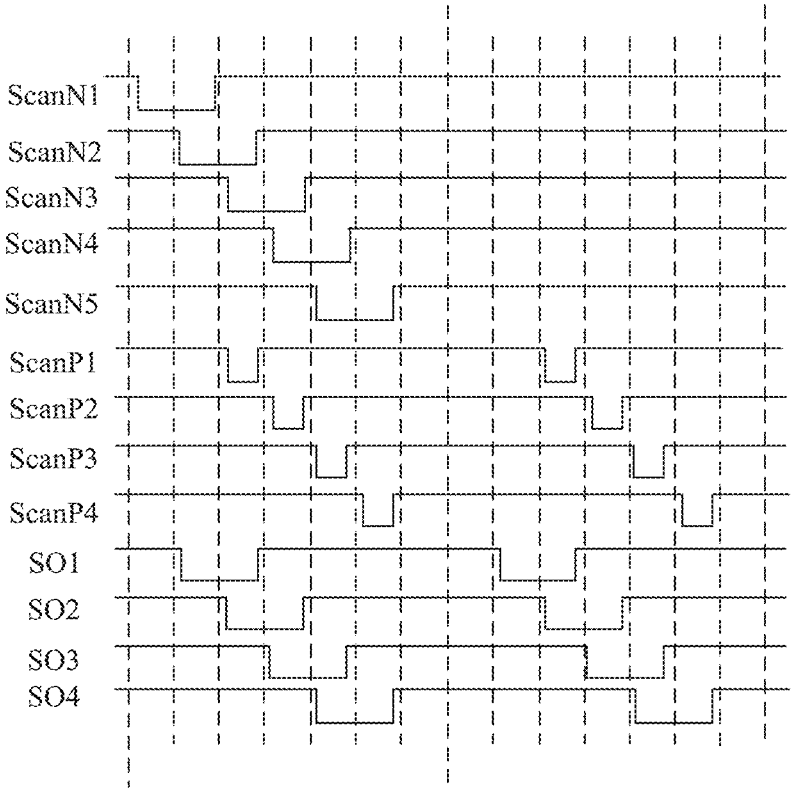
FIG. 14 is yet another timing diagram of pixel driving circuits according to an embodiment of the present disclosure.

FIG. 14 is a timing diagram of pixel driving circuits according to an embodiment of the present disclosure. With reference to FIG. 13 and FIG. 14, in one or more embodiments, the multiple cascaded first scan registers 610 or the multiple cascaded second scan registers 620 sequentially output multiple scan control signals. In a display cycle, scan control signals received by pixel driving circuits in adjacent rows overlap. The scan control signals received by pixel driving circuits in adjacent rows are the scan control signals output by the adjacent first scan register 610 and second scan register 710. Since the scan gate register 610 is located in the first scan driving circuit 60 and the second scan register 710 is located in the second scan driving circuit 70, the operation of the first scan driving circuit 60 and the second scan driving circuit 70 does not affect each other. Consequently, the scan control signals output by the adjacent first scan register 610 and second scan register 710 are configured to overlap so that when the first scan register 610 outputs a scan control signal, the second scan register 710 also outputs a scan control signal. For example, when the first scan shift register SO1 outputs a scan control signal to the first pixel driving circuit P1, the second scan shift register SO2 outputs a scan control signal to the second pixel driving circuit P2 so that the time utilization of the first scan register 610 and the second scan register 710 can be improved.

Based on the one or more preceding embodiments and with continued reference to FIG. 14, in one or more embodiments, the multiple cascaded first scan registers 610 or the multiple cascaded second scan registers 710 sequentially output multiple scan control signals. The multiple scan control signals include a first scan control signal. In a display cycle, the starting moment of at least one gate control signal is located between the starting moment of the first scan control signal and the cut-off moment of the first scan control signal.

In one or more embodiments shown in FIG. 13 and FIG. 14, an example is used for illustration where the array substrate includes multiple cascaded first scan registers 610 and multiple cascaded second scan registers 620. Since an interval of the driving time of 1 row of pixel driving circuits exists between the first scan control signals output by two adjacent first scan registers 610, the falling edge (starting moment) of at least one gate control signal may be set between the falling edge (starting moment) of the first scan control signal received by the second reset control terminal SO of the same pixel driving circuit and the rising edge (cut-off time) of the received first-type gate control signal. In this manner, the duration of the first scan control signal is greater than 1 H. This duration, compared to the duration of 1 H of the first scan control signal in the related art, can extend the reset duration of the second transistor M7 in the pixel driving circuit 10, ensuring that the second reset transistor M7 can be fully reset, thereby improving the reliability of the pixel driving circuit 10.

Figure 15:
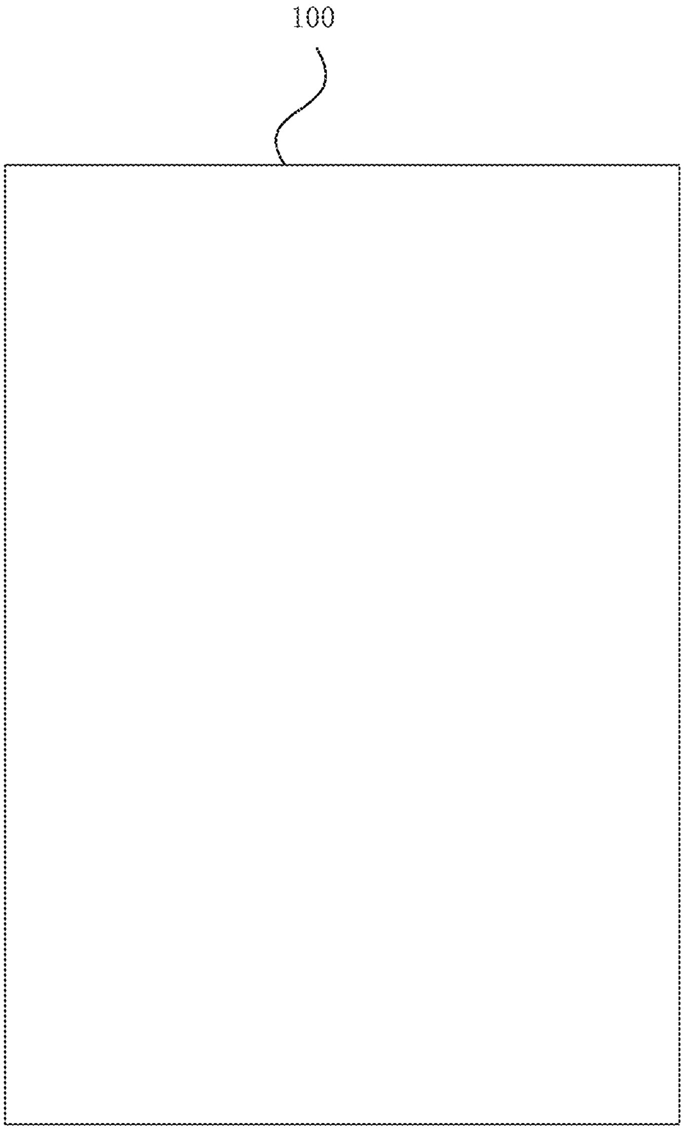
FIG. 15 is a diagram illustrating the structure of a display panel according to an embodiment of the present disclosure.

Embodiments of the present disclosure also provide a display panel. FIG. 15 is a diagram illustrating the structure of a display panel according to an embodiment of the present disclosure. As shown in FIG. 15, the display panel 100 includes any array substrate described in the one or more preceding embodiments. Therefore, the display panel according to one or more embodiments of the present disclosure has the corresponding beneficial effects of the array substrate according to one or more embodiments of the present disclosure. Repetition is not made herein.

Figure 16:
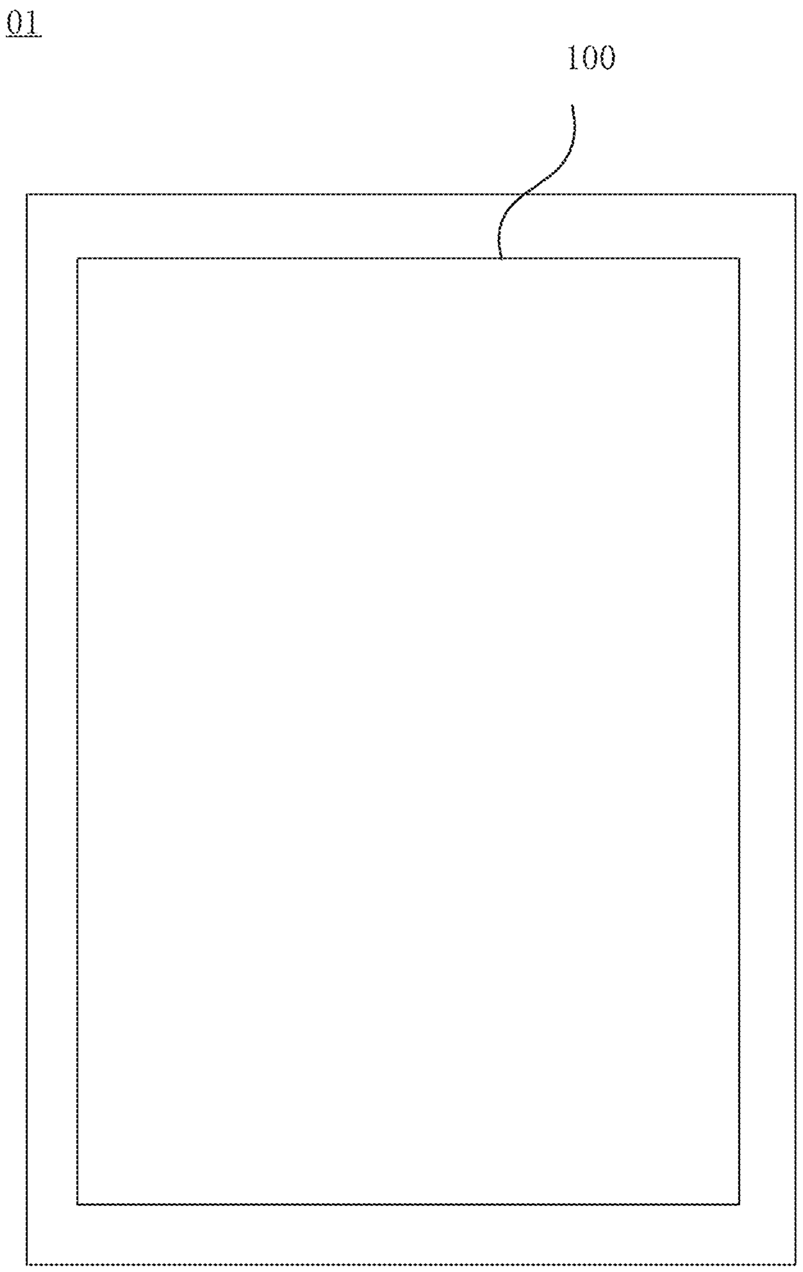
FIG. 16 is a diagram illustrating the structure of a display device according to an embodiment of the present disclosure.

Embodiments of the present disclosure also provide a display device. FIG. 16 is a diagram illustrating the structure of a display device according to an embodiment of the present disclosure. As shown in FIG. 16, the display device 01 includes any display panel 100 described in the one or more preceding embodiments. Therefore, the display device 01 according to this embodiment of the present disclosure has the corresponding beneficial effects of the display panel 100 according to embodiments of the present disclosure. Repetition is not made herein. For example, the display device may be an electronic device such as a mobile phone, a computer, a smart wearable device (for example, a smart watch), or an onboard display device, which is not limited in this embodiment of the present disclosure.

It is to be noted that the above are only preferred embodiments of the present disclosure and the technical principles used therein. It is to be understood by those skilled in the art that the present disclosure is not limited to one or more embodiments described herein. For those skilled in the art, various apparent modifications, adaptations, and substitutions may be made without departing from the scope of the present disclosure. Therefore, while the present disclosure is described in detail via the one or more preceding embodiments, the present disclosure is not limited to the one or more preceding embodiments and may include more equivalent embodiments without departing from the concept of the present disclosure. The scope of the present disclosure is determined by the scope of the appended claims.

What is claimed is:

1. An array substrate, comprising:

a plurality of pixel driving circuits, wherein each of the plurality of pixel driving circuits comprises a drive transistor, a first reset transistor, and a threshold compensation transistor, a first electrode of the first reset transistor is electrically connected to a gate of the drive transistor, a gate of the first reset transistor is electrically connected to a first reset control terminal, a first electrode of the threshold compensation transistor is electrically connected to the gate of the drive transistor, a second electrode of the threshold compensation transistor is electrically connected to a first electrode of the drive transistor, and a gate of the threshold compensation transistor is electrically connected to a compensation control terminal; and a first gate driving circuit, comprising a plurality of cascaded first gate registers, wherein an output terminal of an i-th first gate register of the plurality of cascaded first gate registers is electrically connected to both a compensation control terminal of a pixel driving circuit in a g-th row and a first reset control terminal of a pixel driving circuit in a (g+h)-th row;

wherein i is a positive integer, g is a positive integer, and h is a positive integer greater than 1.

2. The array substrate of claim 1, wherein an (i−1)-th first gate register is electrically connected to a first reset control terminal of the pixel driving circuit in the g-th row; and an output terminal of the (i−1)-th first gate register is electrically connected to an input terminal of the i-th first gate register, wherein i is a positive integer greater than 1.

3. The array substrate of claim 1, further comprising a second gate driving circuit comprising a plurality of cascaded second gate registers, wherein an output terminal of a j-th second gate register of the plurality of cascaded second gate registers is electrically connected to both a compensation control terminal of a pixel driving circuit in a p-th row and a first reset control terminal of a pixel driving circuit in a (p+k)-th row; and wherein p≠g, j is a positive integer, p is a positive integer, and k is a positive integer greater than 1.

4. The array substrate of claim 3, wherein a (j−1)-th second gate register is electrically connected to a first reset control terminal of the pixel driving circuit in the p-th row, and an output terminal of the (j−1)-th second gate register is electrically connected to an input terminal of the j-th second gate register, and wherein j is a positive integer greater than 1.

5. The array substrate of claim 3, wherein the plurality of cascaded first gate registers and the plurality of cascaded second gate registers are located in a same column.

6. The array substrate of claim 5, wherein the plurality of cascaded first gate registers and the plurality of cascaded second gate registers are alternately arranged.

7. The array substrate of claim 5, wherein the first gate driving circuit comprises a first gate register group, the first gate register group comprises m cascaded first gate registers, the second gate driving circuit comprises a second gate register group, and the second gate register group comprises m cascaded second gate registers; and wherein m is a positive integer greater than 1; and wherein the first gate register group and the second gate register group are alternately arranged.

8. The array substrate of claim 1, comprising a display region, a first bezel region, and a second bezel region, wherein the first bezel region and the second bezel region are located on opposite sides of the display region, respectively; and wherein the display region comprises a plurality of pixel driving circuits, and the first bezel region comprises the first gate driving circuit.

9. The array substrate of claim 8, further comprising a row driving circuit and a first scan driving circuit, wherein the row driving circuit comprises a plurality of cascaded row registers, and the first scan driving circuit comprises a plurality of cascaded first scan registers; and wherein the second bezel region comprises at least one of the row driving circuit or the first scan driving circuit.

10. The array substrate of claim 3, wherein the plurality of cascaded first gate registers or the plurality of cascaded second gate registers sequentially output a plurality of gate control signals, gate control signals received by the first reset control terminal comprise a first-type gate control signal, and gate control signals received by the compensation control terminal comprise a second-type gate control signal; and wherein in a display cycle, for a pixel driving circuit of the plurality of pixel driving circuits, a starting moment of each of (h−1) gate control signals of the plurality of gate control signals is located between a starting moment of the first-type gate control signal and a starting moment of the second-type gate control signal.

11. The array substrate of claim 10, wherein in the display cycle, starting moments of gate control signals received by pixel driving circuits in adjacent rows are spaced by an interval of H; and wherein H is a row duration of the pixel driving circuits at a current driving frequency f, and satisfies that $H=1/(f\times b)$; and wherein b is a number of rows of the pixel driving circuits.

12. The array substrate of claim 10, wherein in the display cycle, gate control signals received by pixel driving circuits in adjacent rows overlap.

13. The array substrate of claim 10, wherein the plurality of gate control signals comprise the first-type gate control signal; and in the display cycle, a starting moment of at least one gate control signal of the plurality of gate control signals is located between the starting moment of the first-type gate control signal and a cut-off moment of the first-type gate control signal; and wherein in the display cycle, a starting moment of each of at most (h−1) gate control signals of the plurality of gate control signals is located between the starting moment of the first-type gate control signal and the cut-off moment of the first-type gate control signal.

14. The array substrate of claim 10, wherein each of the plurality of pixel driving circuits further comprises a data write transistor, a first electrode of the data write transistor is electrically connected to a second electrode of the drive transistor, and a gate of the data write transistor is electrically connected to a data write control terminal; and wherein the array substrate further comprises a row driving circuit, the row driving circuit comprises a plurality of cascaded row registers, and an output terminal of a row register of the plurality of cascaded row registers is electrically connected to the data write control terminal.

15. The array substrate of claim 14, at least one of following is satisfied:

wherein the plurality of cascaded row registers sequentially output a plurality of row control signals; and in the display cycle, for the pixel driving circuit, a cut-off moment of a row control signal of the plurality of row control signals is prior to a cut-off moment of the second-type gate control signal;

or, wherein the display cycle comprises a writing stage and a holding stage; and the plurality of cascaded row registers sequentially output a plurality of row control signals;

during the writing stage, a row control signal of the plurality of row control signal controls the data write transistor to write a data signal to the gate of the drive transistor; and during the holding stage, the row control signal controls the data write transistor to write a fixed voltage signal to the second electrode of the drive transistor.

16. The array substrate of claim 10, wherein each of the plurality of pixel driving circuits further comprises a second reset transistor, a first electrode of the second reset transistor is electrically connected to a first electrode of a light-emitting element, and a gate of the second reset transistor is electrically connected to a second reset control terminal;

wherein the array substrate further comprises a first scan driving circuit, the first scan driving circuit comprises a plurality of cascaded first scan registers, and an output terminal of a first scan register of the plurality of cascaded first scan registers is electrically connected to the second reset control terminal; and wherein an output terminal of a q-th first scan register of the plurality of cascaded first scan registers is electrically connected to an input terminal of a (q+1)-th first scan register, and wherein q is a positive integer.

17. The array substrate of claim 16, further comprising a second scan driving circuit, wherein the second scan driving circuit comprises a plurality of cascaded second scan registers, an output terminal of a second scan register of the plurality of cascaded second scan registers is electrically connected to the second reset control terminal; and the plurality of cascaded first scan registers and the plurality of cascaded second scan registers are located in a same column.

18. A display device, comprising a display panel, wherein the display panel comprises an array substrate, and the array substrate comprises:

a plurality of pixel driving circuits, wherein each of the plurality of pixel driving circuits comprises a drive transistor, a first reset transistor, and a threshold compensation transistor, a first electrode of the first reset transistor is electrically connected to a gate of the drive transistor, a gate of the first reset transistor is electrically connected to a first reset control terminal, a first electrode of the threshold compensation transistor is electrically connected to the gate of the drive transistor, a second electrode of the threshold compensation transistor is electrically connected to a first electrode of the drive transistor, and a gate of the threshold compensation transistor is electrically connected to a compensation control terminal; and a first gate driving circuit, comprising a plurality of cascaded first gate registers, wherein an output terminal of an i-th first gate register of the plurality of cascaded first gate registers is electrically connected to both a compensation control terminal of a pixel driving circuit in a g-th row and a first reset control terminal of a pixel driving circuit in a (g+h)-th row;

wherein i is a positive integer, g is a positive integer, and h is a positive integer greater than 1.

19. A display panel, comprising an array substrate, wherein the array substrate comprises:

a plurality of pixel driving circuits, wherein each of the plurality of pixel driving circuits comprises a drive transistor, a first reset transistor, and a threshold compensation transistor, a first electrode of the first reset transistor is electrically connected to a gate of the drive transistor, a gate of the first reset transistor is electrically connected to a first reset control terminal, a first electrode of the threshold compensation transistor is electrically connected to the gate of the drive transistor, a second electrode of the threshold compensation transistor is electrically connected to a first electrode of the drive transistor, and a gate of the threshold compensation transistor is electrically connected to a compensation control terminal; and a first gate driving circuit, comprising a plurality of cascaded first gate registers, wherein an output terminal of an i-th first gate register of the plurality of cascaded first gate registers is electrically connected to both a compensation control terminal of a pixel driving circuit in a g-th row and a first reset control terminal of a pixel driving circuit in a (g+h)-th row;

wherein i is a positive integer, g is a positive integer, and h is a positive integer greater than 1.

20. The array substrate of claim 18, at least one of following is satisfied:

wherein the plurality of cascaded first scan registers or the plurality of cascaded second scan registers sequentially output a plurality of scan control signals; and in the display cycle, scan control signals received by pixel driving circuits in adjacent rows overlap;

or, wherein the plurality of cascaded first scan registers or the plurality of cascaded second scan registers sequentially output a plurality of scan control signals; and the plurality of scan control signals comprise a first scan control signal; and in the display cycle, a starting moment of at least one gate control signal of the plurality of gate control signals is located between a starting moment of the first scan control signal and a cut-off moment of the first scan control signal.

* * * * *